(12) United States Patent
Yamanaka et al.

(10) Patent No.: US 7,328,458 B2
(45) Date of Patent: Feb. 5, 2008

(54) AUTHORING SYSTEM, AUTHORING KEY GENERATOR, AUTHORING DEVICE, AUTHORING METHOD, AND DATA SUPPLY DEVICE, INFORMATION TERMINAL AND INFORMATION DISTRIBUTION METHOD

(75) Inventors: Yasuhiro Yamanaka, Chiba (JP); Kazunori Yoshitomi, Kanagawa (JP); Fumiaki Hisamatsu, Kanagawa (JP); Kenji Yoshino, Tokyo (JP); Shinichi Ueno, Tokyo (JP)

(73) Assignee: Sony Corporation (JP)

( * ) Notice: Subject to any disclaimer, the term of this patent is extended or adjusted under 35 U.S.C. 154(b) by 821 days.

(21) Appl. No.: 10/223,798

(22) Filed: Aug. 20, 2002

(65) Prior Publication Data

US 2003/0079042 A1 Apr. 24, 2003

(30) Foreign Application Priority Data

Aug. 22, 2001 (JP) ............................. 2001-251588

(51) Int. Cl.
*H04L 9/32* (2006.01)

(52) U.S. Cl. ......................................... 726/30; 726/26
(58) Field of Classification Search .................. 726/30
See application file for complete search history.

(56) References Cited

U.S. PATENT DOCUMENTS

| | | | | |
|---|---|---|---|---|
| 5,768,381 | A * | 6/1998 | Hawthorne | 380/284 |
| 6,772,340 | B1 * | 8/2004 | Peinado et al. | 713/168 |
| 6,789,177 | B2 * | 9/2004 | Okada | 711/164 |
| 2002/0001385 | A1 * | 1/2002 | Kawada et al. | 380/201 |
| 2003/0028766 | A1 * | 2/2003 | Gass et al. | 713/164 |

FOREIGN PATENT DOCUMENTS

| | | |
|---|---|---|
| JP | 10-222618 | 8/1998 |
| JP | 11-163853 | 6/1999 |
| JP | 2000-306001 | 11/2000 |
| JP | 2000-330870 A1 | 11/2000 |
| JP | 2001-022271 | 1/2001 |
| JP | 2001-069138 | 3/2001 |
| JP | 2001-075923 | 3/2001 |
| JP | 2001-188701 | 7/2001 |
| JP | 2001-211148 | 8/2001 |

* cited by examiner

*Primary Examiner*—Matthew Smithers
*Assistant Examiner*—David J. Pearson
(74) *Attorney, Agent, or Firm*—Lerner, David, Littenberg, Krumholz & Mentlik, LLP

(57) ABSTRACT

An authoring system authors content data for distribution through an information terminal by encryption for copyright protection. The system includes an authoring device and an authoring key generator. The generator generates a content identifier uniquely allocated to each of the content data, an authoring key enabling key uniquely allocated to the authoring device, and an authoring key obtained by encrypting a content key for encrypting the content data and a second content key using the CID and the CEK. The second content key is formed by encrypting the content key using a root key. The authoring device has a unit which decrypts the content key and the second content key using the CID and the CEK, and a unit which encrypts the content data using the decrypted content key to generate authored encrypted content data.

28 Claims, 24 Drawing Sheets

F I G. 7
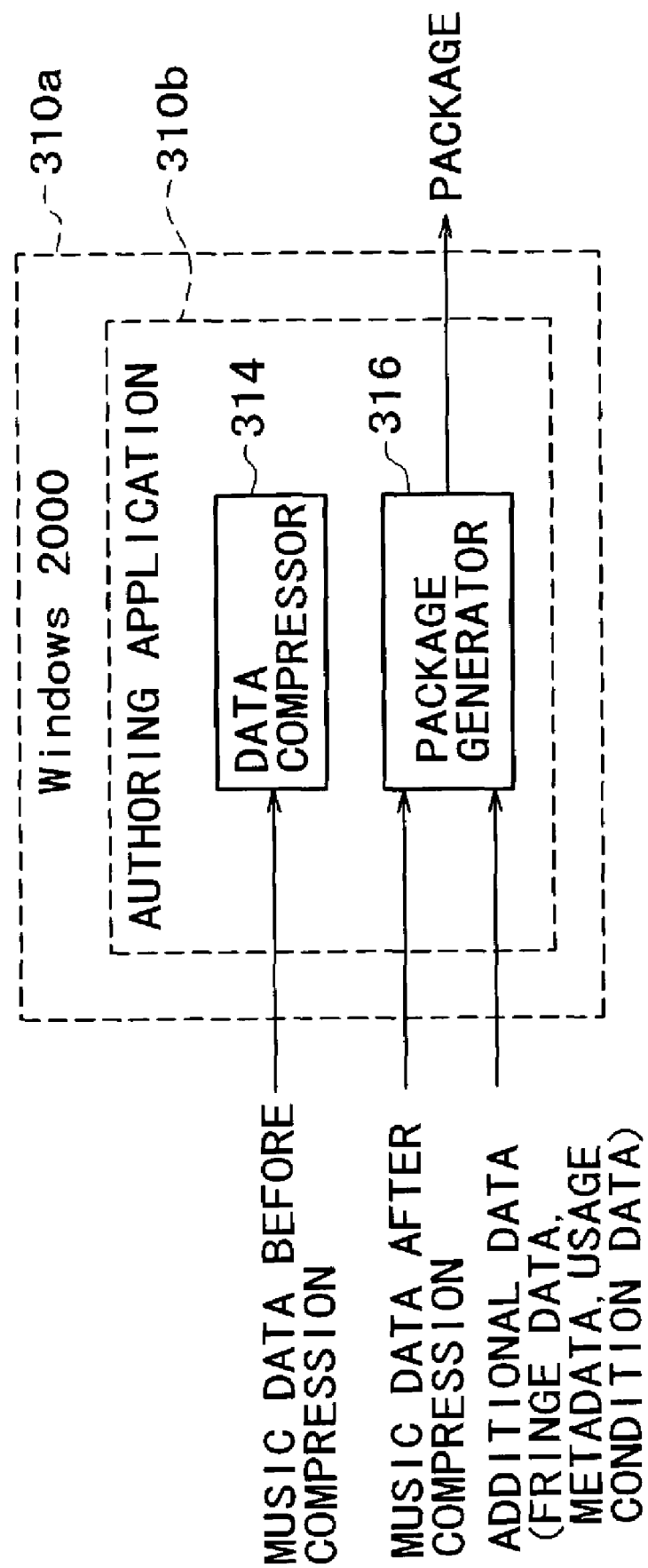

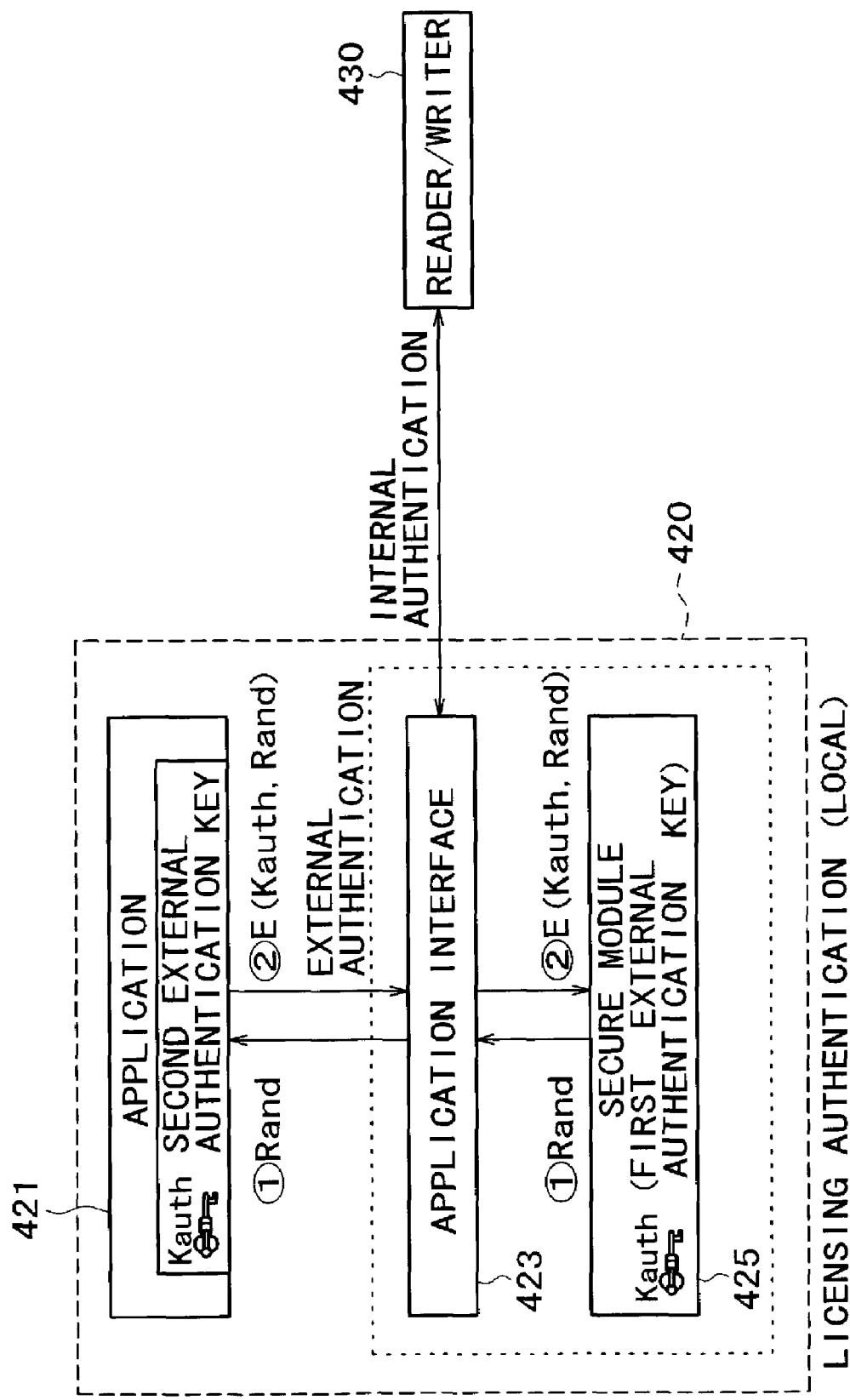

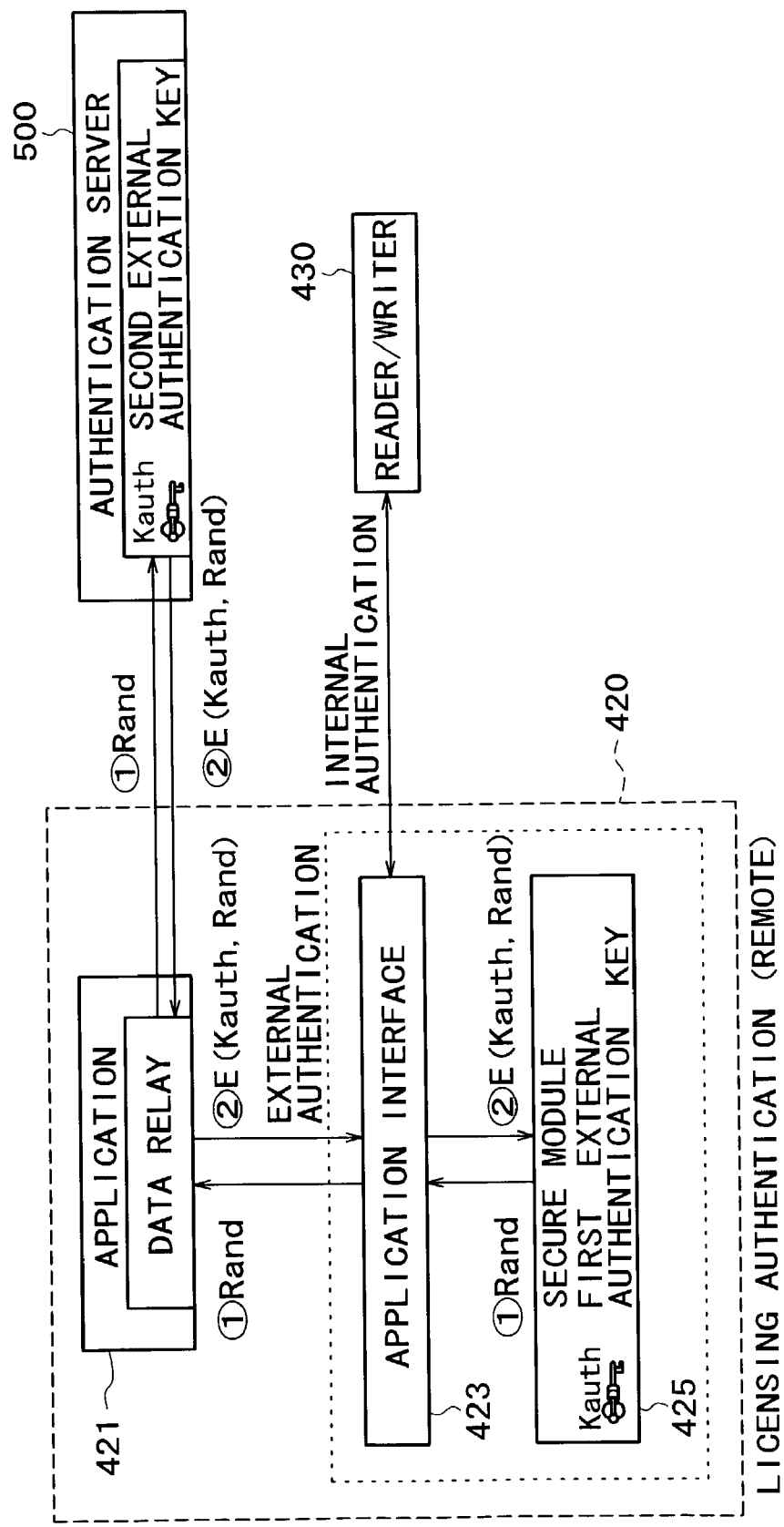

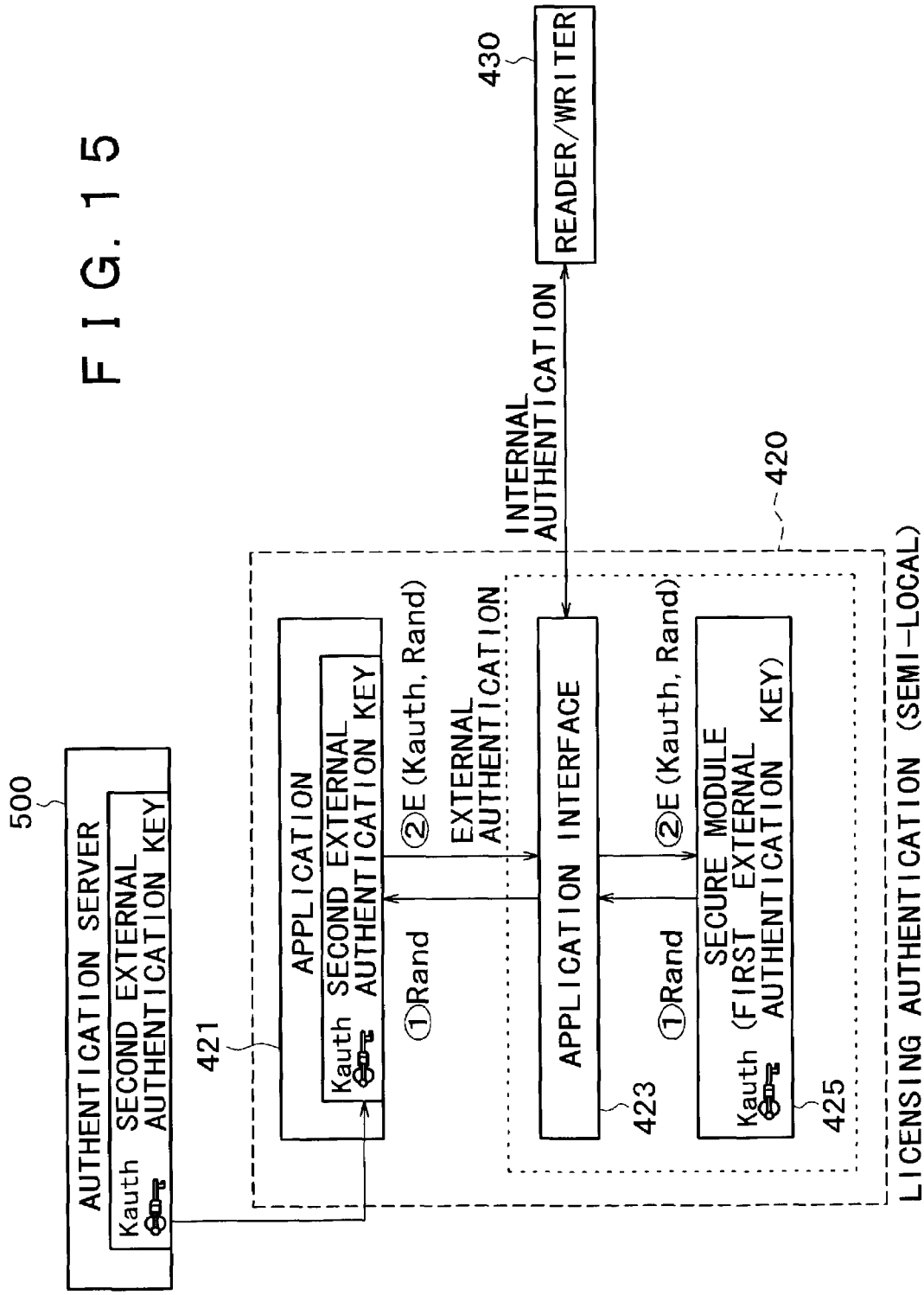

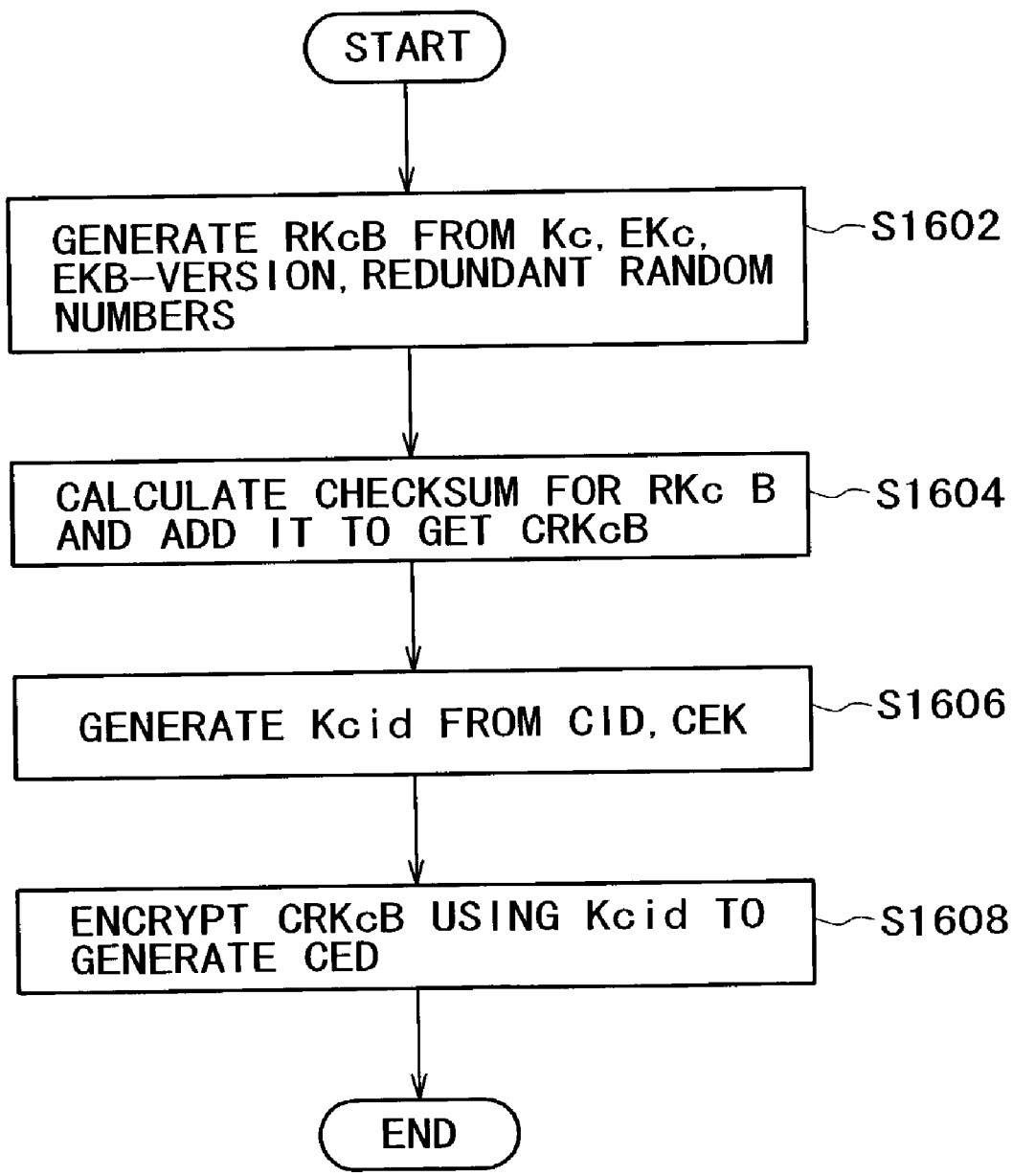

AUTHORING SYSTEM, AUTHORING KEY GENERATOR, AUTHORING DEVICE, AUTHORING METHOD, AND DATA SUPPLY DEVICE, INFORMATION TERMINAL AND INFORMATION DISTRIBUTION METHOD

CROSS-REFERENCE TO RELATED APPLICATIONS

The present application claims priority from Japanese Application No. 2001-251588 filed Aug. 22, 2001, the disclosure of which is hereby incorporated by reference herein.

BACKGROUND OF THE INVENTION

The present invention relates to an information distribution system which securely distributes contents such as music, and particularly relates to an authoring system which authors, by encryption for copyright protection, content data to be distributed through a computer program and a storage medium, an authoring key generator which generates a key for authoring, an authoring device which encrypts content data to author it, and an authoring method therefor, and also to a data supply device, information terminal and information distribution method which enable content data to be securely downloaded onto a storage medium such as a memory stick.

In recent years, with the spread of information networks such as the Internet, there have been suggested methods for the construction of an information distribution system which distributes various types of information such as music data, image data (still and animated), and game programs (hereinafter, such information is collectively called "content") through a network to users. To realize such an information distribution system, it is a prerequisite to guarantee the protection of the copyright in each content. In other words, there is always the risk of large volumes of digital content data being copied. For this reason, several copyright protection techniques for preventing illegal copies of contents have been developed.

Generally, it is said that two encryption stages are necessary in order to prevent a content for distribution from being illegally copied. The first encryption stage is a stage in which, in order to protect the content from illegal copying in the course of its distribution, the content is encrypted during authoring. The second encryption stage is a stage in which, when a user writes the content into his or her storage device through an information terminal such as a kiosk terminal, it is encrypted to prevent later illegal copying.

Regarding these stages, in a conventional content distribution service, the encryption method for authoring is different from that for writing. Therefore, when writing the content into the user's storage device, the content must first be decrypted and again encrypted. This is time consuming. Here, another disadvantage is that the problem of security arises because the content decrypted during writing is temporarily raw data.

Further, in conventional information distribution systems, the content writing module does not have the function of license authentication, so the content is vulnerable in a situation where the module is stolen. Namely, it is possible to make digital copies of large volumes of content data from a stolen writing module.

Another problem of conventional information distribution systems is that protection of the authoring process is less effective and anyone who manages to obtain a copy of the specification for the authoring process can do authoring of the content.

Further, in conventional information distribution systems, if the content is music data, even when the user is an authorized user and going to move it into another medium after downloading it into his/her storage device, he/she cannot move it without sound quality deterioration.

Besides, in conventional information distribution systems, if the content is music data, only music and its title can be recorded into an MD or other medium; so-called fringe data such as jacket pictures and song lyrics cannot be recorded therein and the user has to print out the fringe data on a printer.

SUMMARY OF THE INVENTION

In order to solve the above problems inherent to conventional information distribution systems, according to one aspect of the present invention, an authoring system authors content data (Content) to be distributed through an information terminal by encrypting it for copyright protection. This authoring system includes an authoring key generator and an authoring device.

The authoring key generator generates a content identifier (CID) uniquely allocated to each of the content data (Content); an authoring key enabling key (CEK) uniquely allocated to the authoring device for authoring the content data (Content); and an authoring key (CED) obtained by encrypting a content key (Kc) and a second content key (EKc) using the content identifier (CID) and the authoring key enabling key (CEK), the content key (Kc) being for encrypting the content data (Content) and the second content key (EKc) being obtained by encrypting the content key using a root key (Kroot).

The authoring device has decrypting means for decrypting the content key (Kc) and the second content key (EKc) from the authoring key (CED) using the content identifier (CID) and the authoring key enabling key (CEK), and encrypting means for encrypting the content data (Content) using the decrypted content key (Kc) to generate encrypted content data (E (Kc, Content)).

The authoring device may further have packaging means for bundling the encrypted content data (E (Kc, Content)), the content identifier (CID) and the second content key (EKc) as a package.

In order to solve the above problems, according to another aspect of the present invention, an authoring key generator is provided for generating an authoring key for authoring content data (Content), the authoring key generator including means for generating a content identifier (CID) uniquely allocated to each of the content data (Content); means for generating an authoring key enabling key (CEK) uniquely allocated to an authoring device for authoring the content data (Content); and means for generating an authoring key (CED) by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot).

According to another aspect of the present invention, an authoring device for authoring content data (Content) includes content storing means for storing the content data (Content); key data storing means for storing key data, the key data including a content identifier (CID) uniquely allocated to each of the content data (Content), an authoring key enabling key (CEK) uniquely allocated to the authoring device; and an authoring key (CED) obtained by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot); decrypting means for decrypting the content key (Kc) and the second content key (EKc) from the authoring key (CED) using the content identifier (CID) and the authoring key enabling key (CEK); and encrypting means for encrypting the content data (Content) using the decrypted content key (Kc) to generate encrypted content data (E (Kc, Content)).

The authoring device may further include packaging means for bundling the encrypted content data (E (Kc, Content)), the content identifier (CID) and the second content key (EKC) as a package.

Also, the packaging means may bundle fringe data for the content data (Content) together with the package.

Alternatively, the authoring key (CED) may be encrypted by an authorized authoring key generator which is separate from the authoring device.

In the authoring system, authoring key generator and authoring device, the content key (Kc) may be designed to be obtained from the second content key (EKc) and the root key (Kroot), and to enable decryption of the encrypted content data (E (Kc, Content)) and reproduction of the content data (Content) in a reproducing device holding the root key (Kroot) securely.

The root key (Kroot) may be incorporated in a content enabling key (EKB) encrypted by a device key (Kdevice) associated with the reproducing device, and the authoring key (CED) may further include the encrypted content enabling key (EKB).

Also, the authoring key (CED) may further include encrypted checksum data.

Nullifying means for, upon updating of the authoring key (CED), nullifying the authoring key (CED) which has not been updated may be further provided.

The content data (Content) to be distributed by the information distribution system according to the present invention may include main content data and additional data for the main content data.

According to another aspect of the present invention, a method for authoring content data (Content) includes generating a content identifier (CID) uniquely allocated to each of the content data (Content); generating an authoring key enabling key (CEK) uniquely allocated to an authoring device for authoring the content data (Content); generating an authoring key (CED) by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot); decrypting the content key (Kc) and the second content key (EKc) from the authoring key (CED) using the content identifier (CID) and the authoring key enabling key (CEK); and encrypting the content data (Content) using the decrypted content key (Kc) to generate encrypted content data (E (Kc, Content)).

The authoring method may further include bundling the encrypted content data (E (Kc, Content)), the content identifier (CID) and the second content key (EKc) as a package.

The root key (Kroot) may be incorporated in a content enabling key (EKB) encrypted by a device key (Kdevice) associated with a reproducing device capable of generating the content data (Content), and the authoring key (CED) may further include the encrypted content enabling key (EKB).

The authoring key (CED) may further include encrypted checksum data.

The authoring method may further include nullifying the authoring key (CED) if the authoring key (CED) is not updated during a step of updating the authoring key (CED).

According to another aspect of the present invention, a data supply device for supplying content data stored in an information terminal to a given storage medium includes key holding means for holding a first external authentication key securely; random number generating means for generating random numbers; encrypting means for encrypting the random numbers using the first external authentication key to generate first encrypted data; sending means for sending the random numbers to the information terminal; receiving means for receiving second encrypted data, the second encrypted data being obtained by encrypting the random numbers using a second external authentication key equal to the first external authentication key; and comparing means for comparing the first encrypted data with the second encrypted data.

The comparing means may enable the content data to be supplied to the given storage medium when the first encrypted data coincides with the second encrypted data.

The second external authentication key may be previously stored in the information terminal and the second encrypted data may be formed in the information terminal.

Alternatively, the information terminal may acquire the second external authentication key from a key control unit and the second encrypted data may be formed in the information terminal.

In yet another alternative, the random numbers may be sent through the information terminal to a key control unit, and the second encrypted data may be obtained by encrypting the random numbers within the key control unit using the second external authentication key.

According to another aspect of the present invention, an information terminal for storing content data to be distributed includes first encrypting means for controlling encryption of random numbers generated within a data supply device using a first external authentication key securely held within the data supply device to generate first encrypted data; second encrypting means for receiving the random numbers from the data supply device and for acquiring second encrypted data by encrypting the random numbers using a second external authentication key equal to the first external authentication key; and licensing means for permitting the data supply device to supply the content data to a given storage medium only when the first encrypted data coincides with the second encrypted data.

The second encrypting means may store the second external authentication key in advance and generate the second encrypted data within the information terminal.

The second encrypting means may obtain the second external authentication key from a key control unit and generate the second encrypted data within the information terminal.

The second encrypting means may send the random numbers to a key control unit and acquire the second encrypted data from the key control unit.

According to another aspect of the present invention, a data supply device includes recording means for recording content data recorded in an information terminal to a given storage medium; data record control means for controlling operation of the recording means; first authentication means for determining whether the content data has been generated by a legal authoring system; and second authentication means for performing a mutual check between the recording means and the data record control means, wherein the data record control means controls the recording means to record the content data to the given storage medium only when the content data has been generated by a legal authoring system and the mutual check is successful.

The first authentication means may determine whether the content data has been generated by a legal authoring system by referring to a Message Authentication Code (MAC hereinafter) written in the content data by the legal authoring system.

The second authentication means may transfer a content enabling key (EKB), obtained by encrypting a root key (Kroot) using a device key (Kdevice) of the legal authoring system, to the data record control means and the recording means; the data record control means may decrypt the root key (Kroot) using a device key (Kdevice) of the data record control means to obtain a first decrypted root key; and the recording means may decrypt the root key (Kroot) using a device key (Kdevice) of the recording means; wherein the mutual check is successful when the first decrypted root key coincides with the second decrypted root key.

The data supply device may include reproduction control means for controlling reproduction of the content data in the given storage medium.

The recording means may record plural content data to the given storage medium, and the reproduction control means may permit reproduction of the plural content data only after the plural content data has been recorded to the given storage medium.

According to another aspect of the present invention, a method for supplying content data stored in an information terminal to a given storage medium includes generating random numbers; encrypting the random numbers using a securely held first external authentication key to generate first encrypted data; sending the random numbers to the information terminal; encrypting the random numbers using a second external authentication key equal to the first external authentication key; receiving the second encrypted data from the information terminal; and comparing the first encrypted data with the second encrypted data.

The method may further include supplying the content data to the given storage medium when the first encrypted data coincides with the second encrypted data.

The method may alternatively include storing the second external authentication key in the information terminal prior to the step of encrypting the random numbers within the information terminal.

The method may further include supplying the second external authentication key from a key control unit to the information terminal prior to the step of encrypting the random numbers within the information terminal.

The method may alternatively include sending the random numbers through the information terminal to a key control unit, and encrypting the random numbers within the key control unit using the second external authentication key.

Further, according to another aspect of the present invention, an information supply method used in a data supply device having recording means for recording content data from an information terminal to a given storage medium and data record control means for controlling operation of the recording means includes determining whether the content data has been generated by a legal authoring system; performing a mutual check between the recording means and the data record control means; and recording the content data to the given storage medium only when the content data has ben generated by a legal authoring system and the mutual check is successful.

The step of determining whether the content data has been generated by a legal authoring system may include referring to a MAC written in the content data by the legal authoring system.

The second authentication step may include transferring a content enabling key (EKB), obtained by encrypting a root key (Kroot) using a device key (Kdevice) of the legal authoring system, to the data record control means and the recording means; decrypting the root key (Kroot) using a device key (Kdevice) of the data record control means to obtain a first decrypted root key; and decrypting the root key (Kroot) using a device key (Kdevice) of the recording means to obtain a second decrypted root key; wherein the mutual check is successful when the first decrypted root key coincides with the second decrypted root key.

The data supply method may further include reproducing the content data in the given storage medium.

The recording step may include recording plural content data to the given storage medium, and the reproducing step may include reproducing the plural content data only after the plural content data has been recorded to the given storage medium.

Other and further objects, features and advantages of the invention will appear more fully from the following description.

BRIEF DESCRIPTION OF THE DRAWINGS

FIG. 7 is a block diagram showing an example of an authoring system configuration in the information distribution system 100;

FIG. 13 is a block diagram showing an example of external authentication (local) in the information terminal 400;

FIG. 14 is a block diagram showing an example of external authentication (remote) in the information terminal 400;

FIG. 15 is a block diagram showing an example of external authentication (semi-local) in the information terminal 400;

FIG. 16 is a flowchart showing the authoring key generating process in the information distribution system 100;

DETAILED DESCRIPTION

Figure 1:
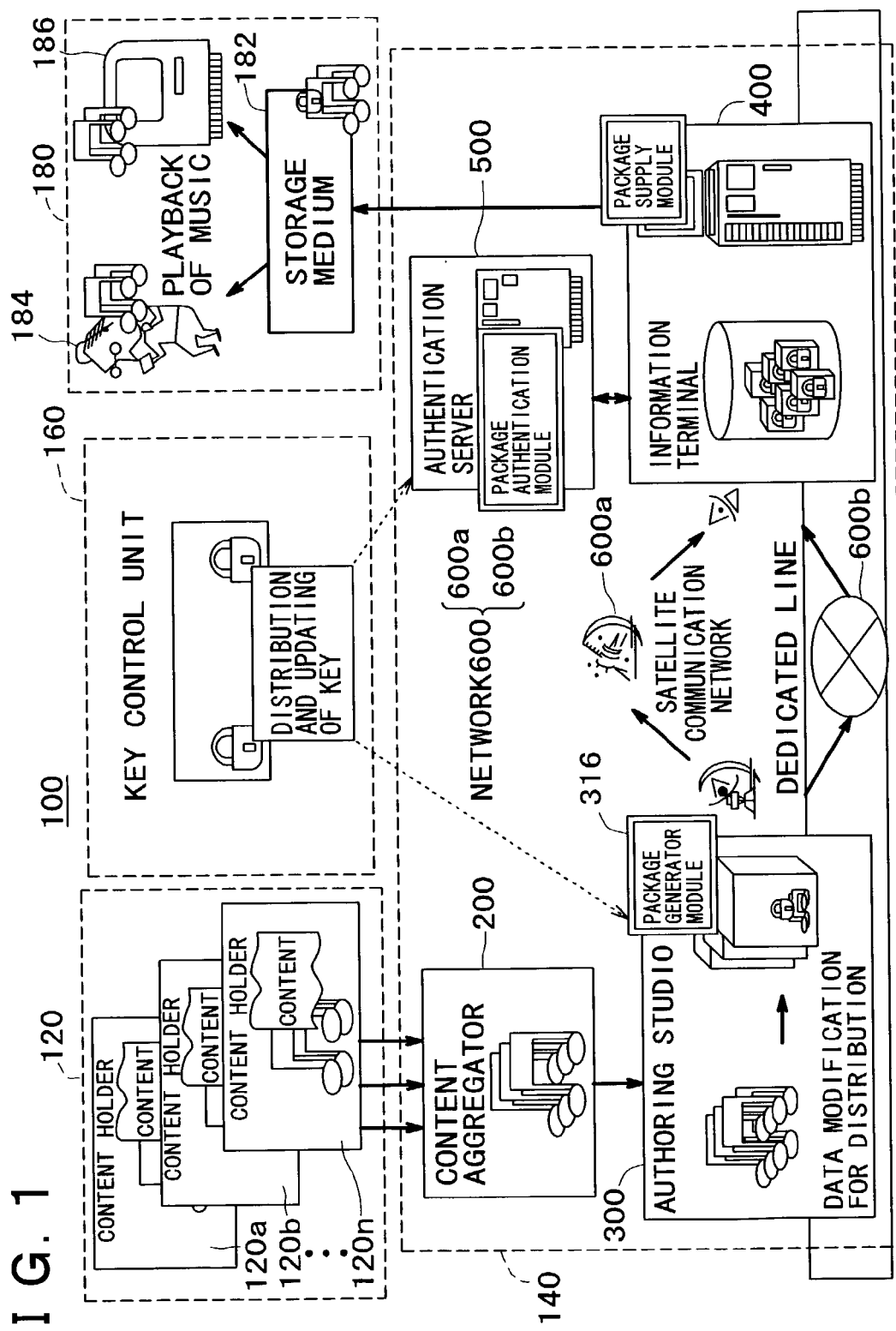
FIG. 1 is a block diagram showing the configuration of an information distribution system 100 according to an embodiment of the present invention.

Preferred embodiments of the present invention as an information distribution system or the like will be described below, focusing on an information distribution system which distributes music data as content data. In the explanation given below and the accompanying drawings, components which have virtually equivalent functions will be designated with the same reference numerals and duplication of their description will be avoided.

1. Information to be Distributed

For a better understanding of the information distribution system according to the present invention, the information to be distributed is explained first.

The information to be distributed in the information distribution system according to an embodiment of the invention is "content data for distribution." Content data for distribution includes both main content data and additional data. In this specification, what is merely called "content data" includes both main content data and additional data.

"Main content data" is information which is mainly distributed in this information distribution system. More specifically, it may be music data, image data (still image data and animated image data), game programs or the like which are created in a content holder.

"Additional data" is data pertaining to the main content data. If the main data is music data, the additional data may include fringe data such as jacket picture data and lyrics, and/or metadata such as music titles and artist names, and/or usage condition data such as the allowable number of checkouts to another device or the allowable number of imports into a computer.

"Package data" is an encrypted and packaged form of the content data to be distributed through an information terminal, where it has been encrypted for copyright protection and bundled as a package. Package data is generated by a package generator 316 in an authoring studio 300. Each package contains encrypted content data (E (Kc, Content)) which is obtained by encrypting the main content data and the additional data, and also a second content key (EKc) and a content enabling key (EKB) which will be described later.

2. Outline of the Information Distribution System

FIG. 1 shows the configuration of an information distribution system 100 according to the present invention. As shown in FIG. 1, the information distribution system 100 mainly consists of a content holder section 120, a content distribution section 140, a key control unit 160, and a user device 180. Next, each of the constituent parts will be explained.

2.1 Content Holder Section 120

Figure 2:
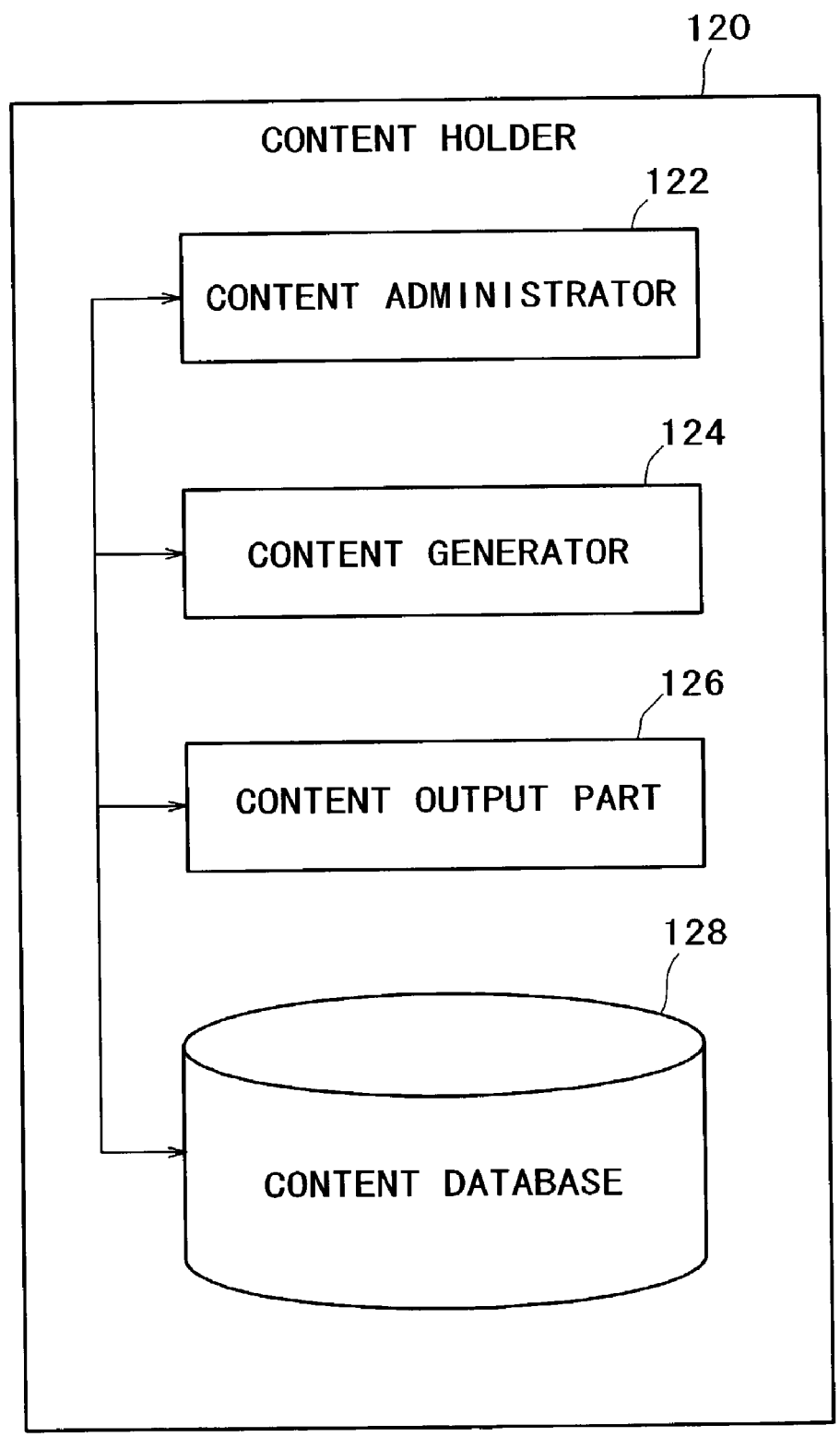
FIG. 2 is a block diagram showing the general structure of a content holder 120 in the information distribution system 100.

The content holder section 120 is a group of data processors such as servers belonging to a phonograph record company. The content holder section 120 consists of plural content holders 120a to 120n which have a similar function. As shown in FIG. 2, each of the content holders 120a to 120n is, for example, a server as a computer having a content administrator 122, a content generator 124, a content output part 126 and a content database 128.

Content Administrator 122

The content administrator 122 controls the content data, such as music data produced by a phonograph record company, etc., related to the content holder 120a. If the content data to be controlled here concerns music, it contains additional data including fringe data such as jacket picture data and lyrics data, metadata such as music titles and artist names, and usage condition data, in addition to music data as the main content data.

Content Generator 124

The content generator 124 generates the content data associated with the content holder 120a. If the content data to be generated here concerns music, it contains additional data including fringe data such as jacket picture data and lyrics data, metadata such as music titles and artist names, and usage condition data, in addition to music data as the main content data.

Content Output Part 126

The content output part 126 transfers the content data which has been generated and controlled by the content holder 120a, to a content aggregator 200 in the content distribution section 140 (described later). Here, the content data may be transferred through a network like the Internet, or through a storage medium like a CD-R or DVD-RAM.

Content Database 128

The content database 128 is a large capacity medium which stores the content data generated by the content generator 124. If the content data to be stored and controlled here concerns music, it contains additional data including fringe data such as jacket picture data and lyrics data, metadata such as music titles and artist names, and usage condition data, in addition to music data as the main content data

2.2 Content Distribution Section 140

The content distribution section 140 is the core of the information distribution system according to the invention. In the content distribution section 140, content data for distribution is encrypted for copyright protection and bundled as package data. The package data is then sent through a network 600 to an information terminal 400 such as a kiosk terminal, from which it is supplied to a storage device 182 owned by a user.

The content distribution section 140 mainly consists of a content aggregator 200, an authoring studio 300, an information distributor (kiosk terminal) 400, an authentication server 500, and a network 600.

2.2.1 Content Aggregator 200

The content aggregator 200 collects content data such as music data from the content holder section 120 and edits it. If the content data to be collected here concerns music, it contains additional data including fringe data such as jacket picture data and lyrics data, metadata such as music titles and artist names, and usage condition data, in addition to music data as the main content data.

Figure 3:
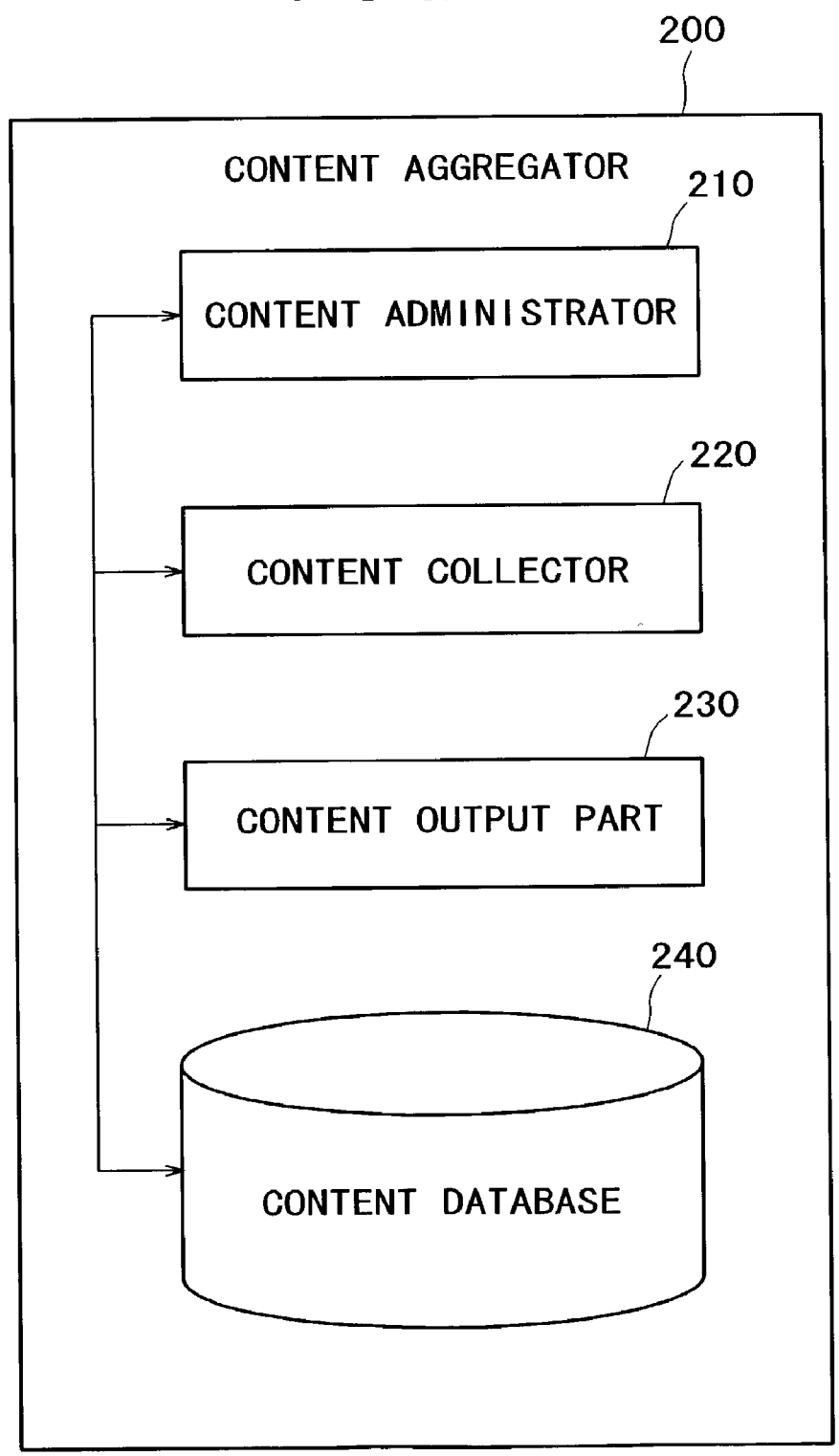
FIG. 3 is a block diagram showing the general structure of a content aggregator 200 in the information distribution system 100.

As shown in FIG. 3, the content aggregator 200 mainly consists of a content administrator 210, a content collector 220, a content output part 230, and a content database 240.

Content Administration 210

The content administrator 210 selects an attractive and valuable content for distribution through the information distribution system 100 from the contents held by the content holders 120a to 120n. The content administrator 210 instructs the content collector 220 to access a specific content holder (for example, the content holder 120a) directly or to access a medium distributed from the content holder 120a to collect content data. At the same time, the content administrator 210 edits the content data collected from the content holder section 120.

Content Collector 220

The content collector 220, upon receipt of an instruction from the content administrator 210, accesses the content holder 120a directly or accesses a medium distributed from the content holder 120a to load content data and store it in the content database 240.

Content Database 240

The content database 240 temporarily stores and controls the content data loaded by the content collector 220. The content database 240 also stores and controls various records on operation of the content aggregator 200.

Content Output Part 230

The content output part 230 reads the content data collected by the content collector 220 from the content database 240 in response to a request from the authoring studio 300 (described later), and outputs it to the authoring studio 300. Here, the output of the content data to the authoring studio 300 may be done through a public network such as the Internet or a more secure dedicated network, or through a storage medium such as a CD-R or DVD-RAM.

2.2.2 Authoring Studio 300

The authoring studio 300 has a function of modifying content data for distribution to make it compatible with the information distribution system according to the invention. More specifically, the process of modifying content data has two steps: a first step of compressing the content data to facilitate its distribution and a second step of authoring (encrypting) and packaging it.

Figure 4:
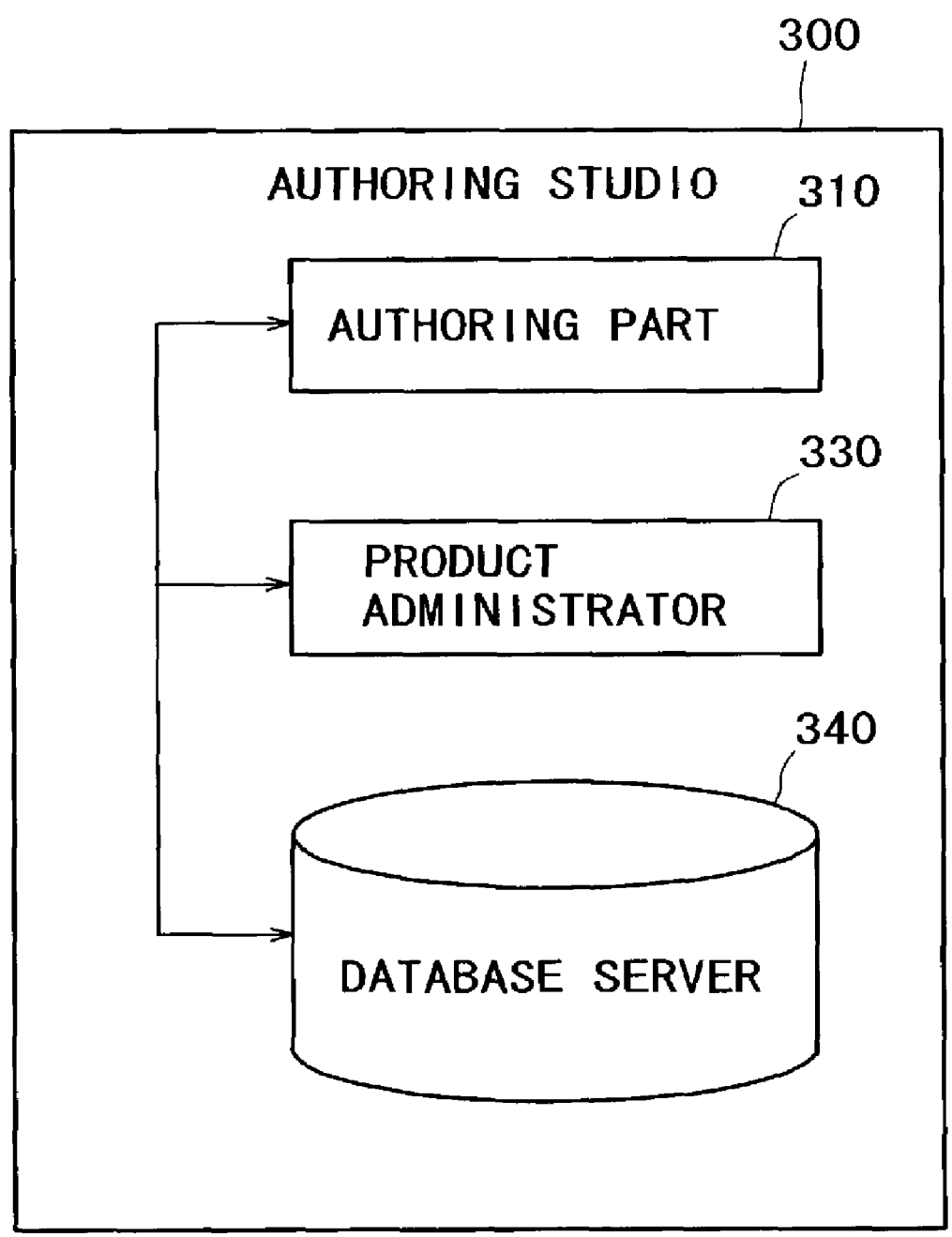
FIG. 4 is a block diagram showing the general structure of an authoring studio 300 in the information distribution system 100.

As illustrated in FIG. 4, the authoring studio 300 mainly consists of an authoring part 310, a product administrator 330, and a database server 340.

Authoring Part 310

Figure 5:
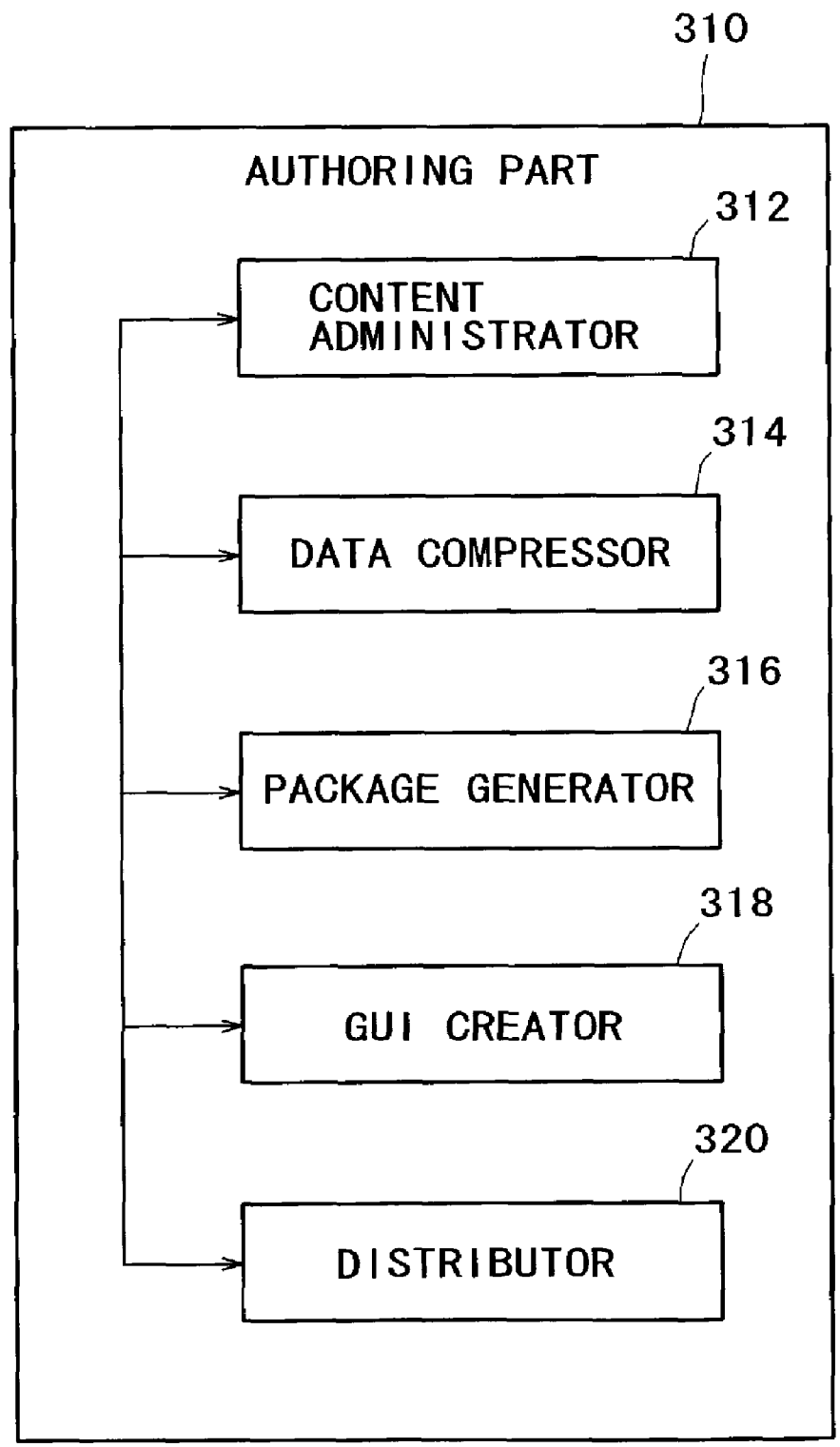
FIG. 5 is a block diagram showing the general structure of an authoring part 310 in the authoring studio 300.

The authoring part 310 is, for example, a computer program which runs on a computer. As illustrated in FIG. 5, it has a content administrator 312, a data compressor 314, a package generator module 316, a GUI creator 318, and a distributor 320.

Content Administrator 312

The content administrator 312 controls the content data received from the content aggregator 200. If the content data to be controlled here concerns music, it contains additional data including fringe data such as jacket picture data and lyrics data, metadata such as music titles and artist names, and usage condition data, in addition to music data as the main content data.

Data Compressor 314

The data compressor 314 is, for example, software which compresses the content data received from the content administrator 312. If the content data is music data, the compression method may be the ATRAC3 method which can compress the data to reduce it to approx. a tenth of the original size. It is needless to say that the compression method which can be used here is not limited to ATRAC3 (Adaptive Transform Acoustic Coding 3), but other audio compression methods such as MP3 (MPEG-1 Audio Layer 3), AAC (Advanced Audio Coding), WMA (Windows Media Audio), Twin VQ (Transform-Domain Weighted Interleave Vector Quantization), and QDX may be used.

Package Generator (Authoring Device) 316

The package generator (authoring device) 316 is, for example, software which has a function to encrypt the content data as compressed by the data compressor 314 for authoring it, and package it. In other words, the package generator 316 functions as an authoring device which authors content data.

The authoring device 316 and the various keys used in the authoring device 316 will be described in detail later in connection with an authoring key generator 160; here it is briefly outlined.

Figure 6:
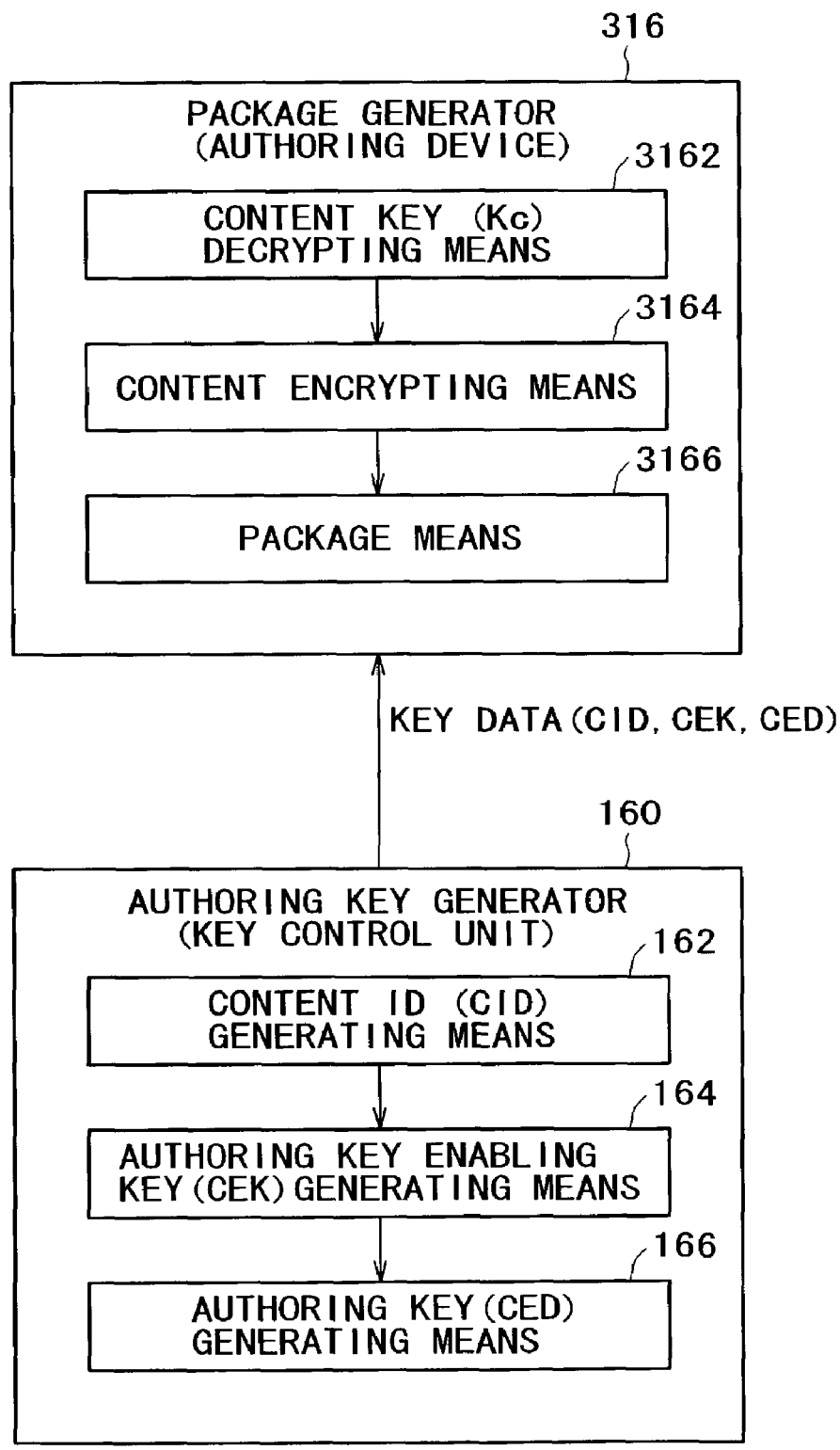
FIG. 6 is a block diagram roughly showing the relationship between an authoring device 316 and an authoring key generator 160 in an authoring system for the information distribution system 100.

As illustrated in FIG. 6, the authoring device 316 mainly consists of content key (Kc) decrypting means 3162, content encrypting means 3164, and packaging means 3166.

Content Key (Kc) Decrypting Means 3162

The content key (Kc) decrypting means 3162 receives an authoring key (CED), a content identifier (CID) and an authoring key enabling key (CEK) from an authoring key generator 160 (described later). Then, it decrypts the content key (Kc) and the second content key (EKc) from the authoring key (CED) using the content identifier (CID) and the authoring key enabling key (CEK).

Content Encrypting Means 3164

The content encrypting means 3164 encrypts content data using the above-said content key (Kc) as decrypted by the content key (Kc) decrypting means 3162 to generate encrypted content data (E (Kc, Content)). In the information distribution system according to the present invention, this encrypted content data (E (Kc, Content)) is packaged together with prescribed information and sent to the information terminal 400.

Packaging Means 3166

The packaging means 3166 bundles the encrypted content data (E (Kc, Content)) obtained by the content encrypting means 3164, the content identifier (CID), and the second content key (EKc) as a data package. The package contains additional data including fringe data such as jacket picture data and lyrics data, metadata such as music titles and artist names, and usage condition data, in addition to music data as the main content data.

Functional Structure of the Package Generator 316

FIG. 7 is a block diagram showing the functions of the package generator 316 in a more concrete form. As shown in the figure, the package generator 316 is an authoring application 310b which runs on an operating system 310a like Windows 2000. The authoring application 310b incorporates a data compressor 314 and a package generator 316 making up a DLL (Dynamic Link Library). In order to simplify the explanation, other applications which are incorporated in the authoring application 310b, such as a content administrator 312, are not shown.

As illustrated in the figure, uncompressed music data in a given sound format (for example, WAV format) is sent to the data compressor 314 where it is compressed in a given compression format (for example, ATRAC3). Main content data, such as music data which has been compressed by the data compressor 314, is sent to the package generator 316 and encrypted and packaged together with additional data including fringe data, metadata and usage condition data.

In this way, the authoring device (package generator) 316 according to the present invention can compress, encrypt and package data in the course of authoring it. As a consequence, it is possible to reduce the workload which is required for calculation or communication at the time of distribution or sale of content data. In particular, it can considerably reduce downloading time at an information terminal and the user can download authored content data within a time which is virtually the same as that required for copying it.

GUI Creator 318

Again referring to FIG. 5, the GUI creator 318 in the authoring part 310 has a function to create a GUI (Graphic User Interface) for display on a kiosk terminal as an information terminal (described later). The GUI created here is distributed through a distributor 320 to the kiosk terminal. A user who wishes to download a content follows instructions displayed on the monitor screen of the kiosk terminal to purchase the content and download it to a given storage medium and can import the downloaded content to a computer and have it checked out from the computer to another reproducing device or storage medium.

Distributor 320

The distributor 320 distributes content data compressed and packaged by the data compressor 314, the package generator 316 and other package applications as mentioned above, as well as the GUI created by the GUI creator 318, to information terminals 400 (kiosk terminals, etc).

Product Administrator 330

Again referring to FIG. 4, the product administrator 330 administers contents modified for distribution by the authoring part 310 as packaged products. More particularly, the product administrator 330 monitors the distribution of packaged contents and works in conjunction with a sales administration division, etc. of the kiosk control center to sell products and collect bills. The product administrator 330 collects and administers statistical data on records of sales at the kiosk terminal 400 as an information terminal and such statistical data will be referred to in product development in the future. The sales-related records in the product administrator 330 are stored in the database server 340.

Database Server 340

The database server 340 stores and administers various data related to the authoring studio 300. More particularly, the database server 340 stores contents modified for distribution in the authoring part 310. If the content data to be administered here concerns music, it contains additional data including fringe data such as jacket picture data and lyrics data, metadata such as music titles and artist names, and usage condition data, in addition to music data as the main content data.

The database server 340 stores and administers sales-related records in the product administrator 330, namely, packaged product sales data and records of sales at kiosk terminals.

2.2.3 Information Terminal 400

The information terminal 400 is also called a kiosk terminal. It stores packaged contents distributed from the authoring studio 300 and, in response to a request from the user 180, downloads the requested content into his/her storage medium 182. The information terminal 400 may be a kiosk terminal installed in a place where many people come in and out, like a convenience store or gas station, or a personal computer installed in a place easily accessible by individual users.

Figure 8:
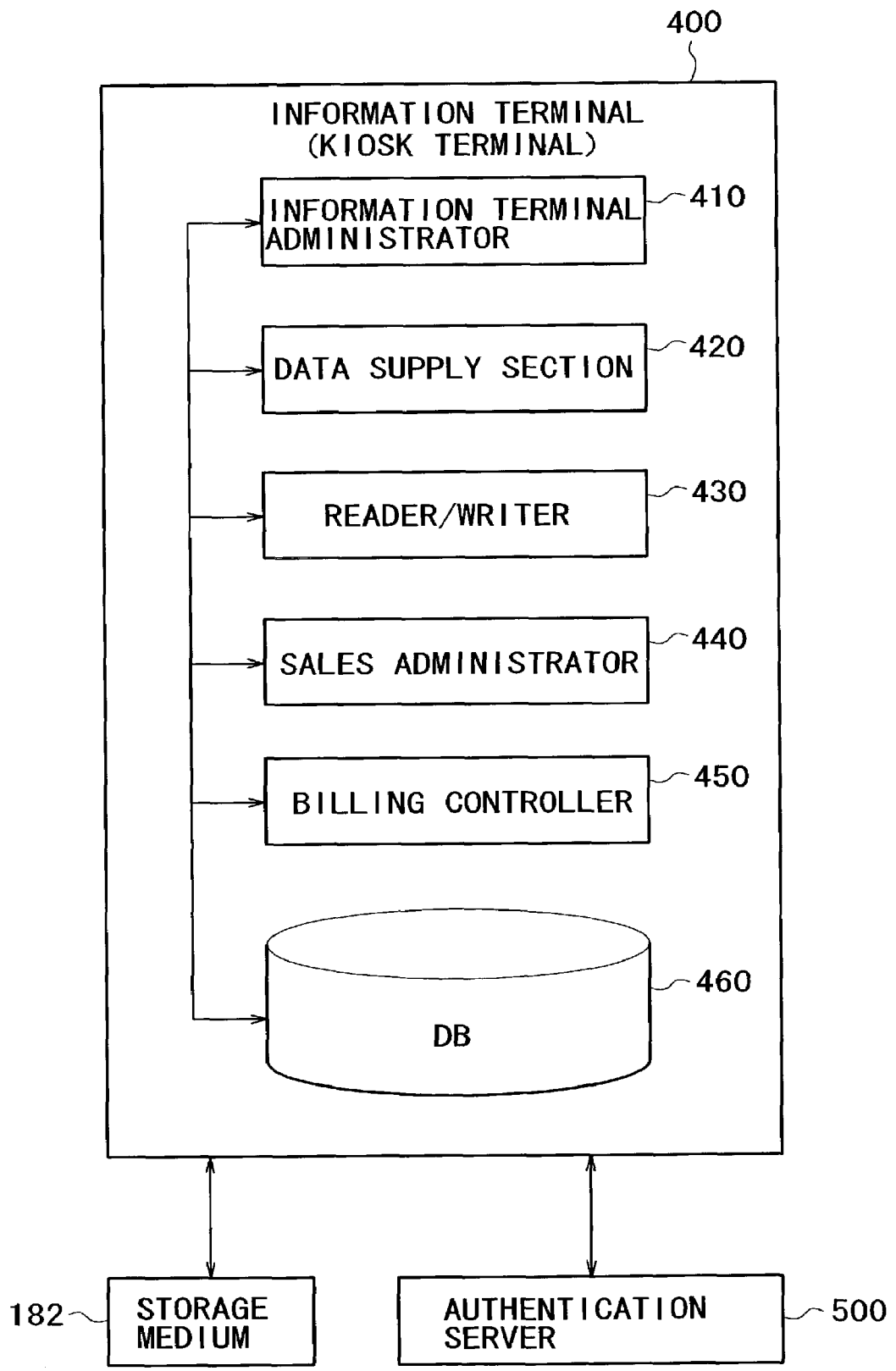
FIG. 8 is a block diagram showing the general structure of an information terminal 400 in the information distribution system 100.

As shown in FIG. 8, the information terminal 400 mainly consists of an information terminal administrator 410, a data supply section 420, a reader/writer (R/W) 430, a sales administrator 440, a billing controller 450, and a database 460.

Information Terminal Administrator 410

The information terminal administrator 410 is, for example, software which administers various tasks to be done at the information terminal 400. The information terminal administrator 410 works in conjunction with the data supply section 420 and reader/writer (R/W) 430 to administer external and internal authentication at the information terminal and, after authentication, gives permission to write content data into a storage medium 182 such as a memory stick.

The information terminal administrator 410 also has a function to administer sales of contents and billing to the user 180 in cooperation with the sales administrator 440 and the billing controller 450. The information terminal administrator 410 also administers the database 460 which stores packaged contents or records of sales and billing.

Data Supply Section 420

The data supply section 420 checks or authenticates a package to see if it has been generated by a legal authoring system. If so (an affirmative authentication is made), it writes the content through the reader/writer (R/W) 430 into the storage medium 182.

Figure 9:
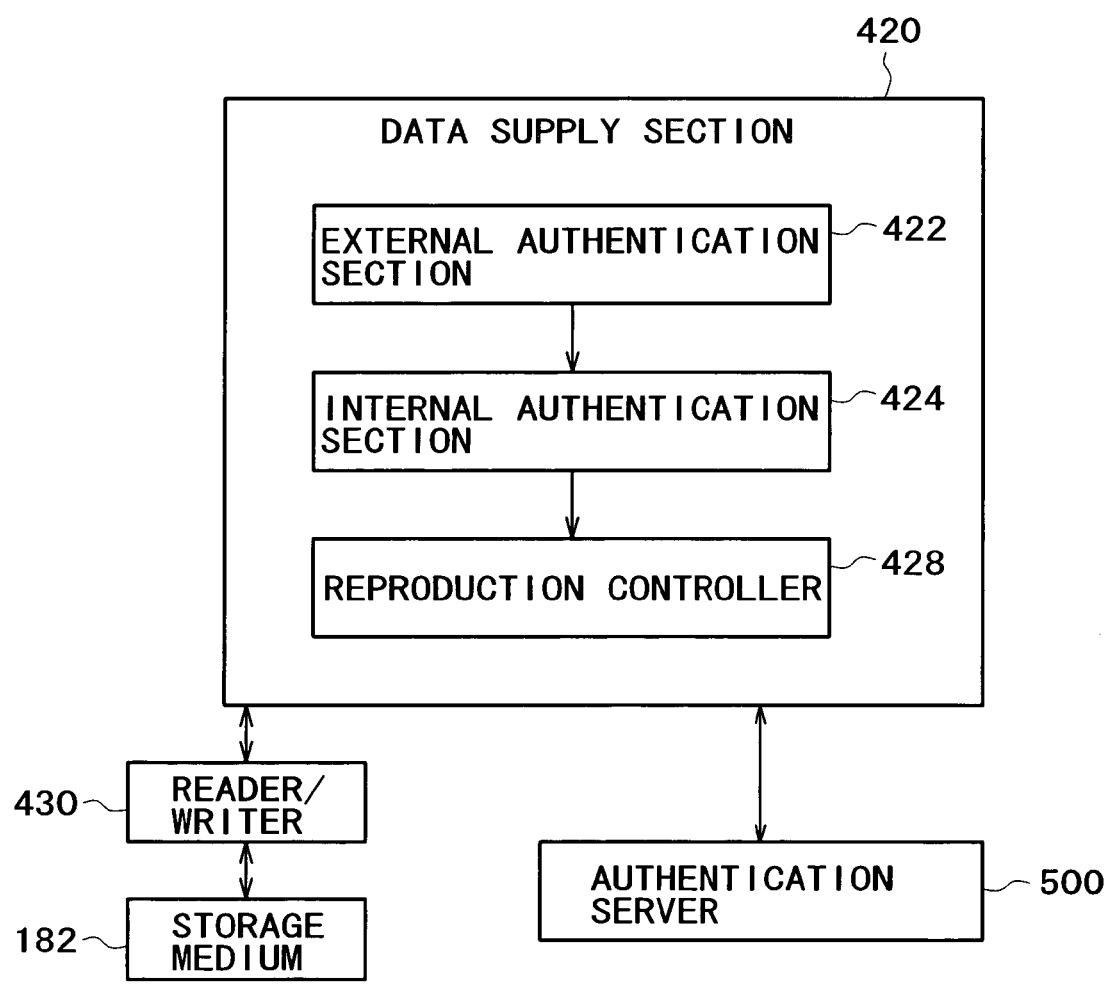
FIG. 9 is a block diagram showing the general structure of a data supply section 420 in the information distribution system 100.

The data supply section 420 may be software which mainly consists of an external authentication section 422, an internal authentication section 424, and a reproduction controller 428, as shown in FIG. 9.

Figure 12:
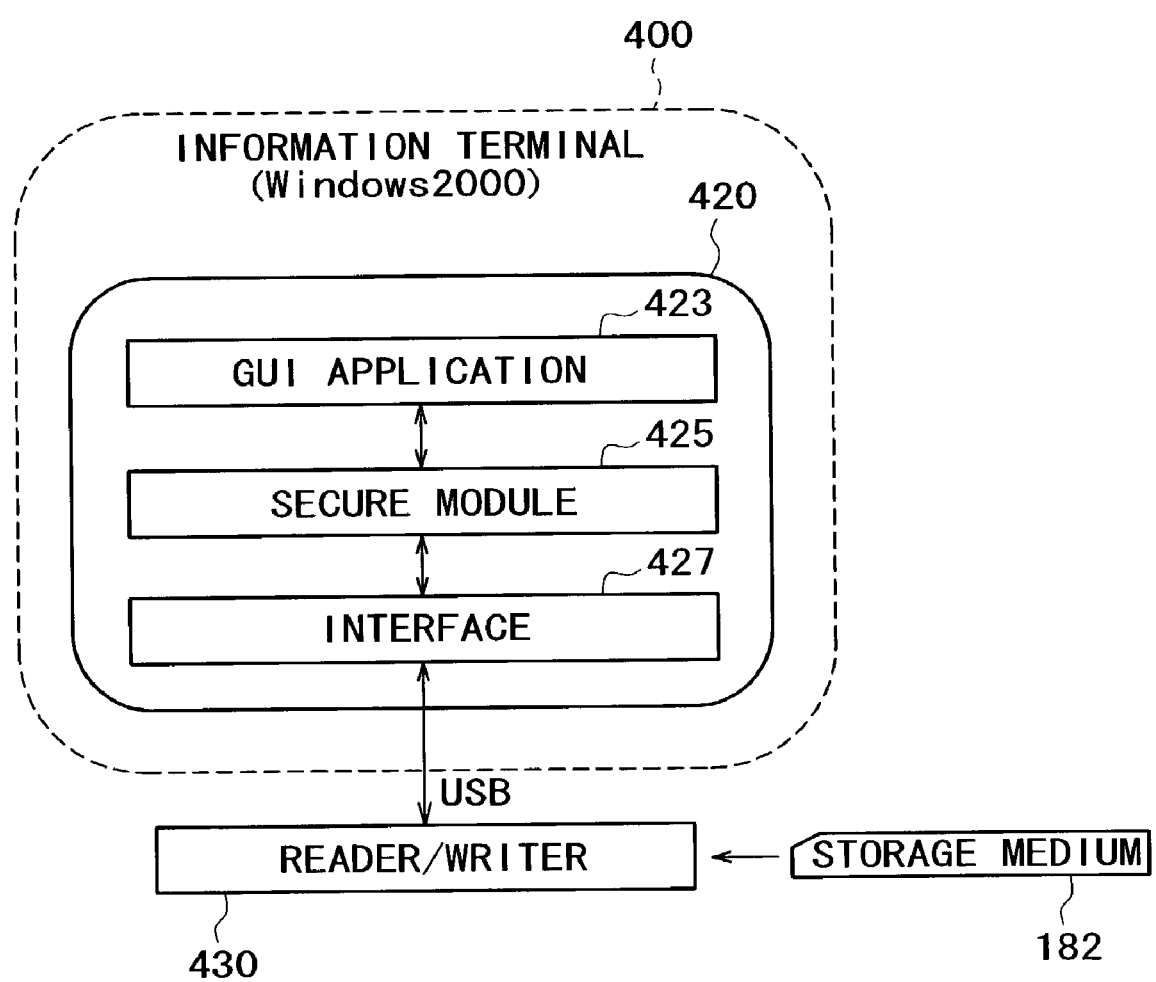
FIG. 12 is a block diagram showing an example of the system configuration of an information terminal 400 in the information distribution system 100.

The data supply section 420 may constitute a DLL (Dynamic Link Library) which is incorporated in the information terminal 400. FIG. 12 shows an example of the data supply section 420 as an application running on a given operating system (for example, Windows 2000). For a better understanding, in FIG. 12, the data supply section 420 is shown in a simplified form with a GUI application 423, a secure module 425, and an interface 427 as the main components.

External Authentication Section 422

Again referring to FIG. 9, the external authentication section 422 checks to see if the data supply section 420 is legal or is authorized to supply the content data stored in the information terminal 400 to the outside by comparing a first external authentication key (Kauth (1)) previously stored in the data supply section 420 with a second external authentication key (Kauth (2)) held by the authentication server 500.

External authentication of the data supply section 420 must be carried out whenever it is activated. However, once its authenticity has been proven, no further external authentication is needed while it is running.

Figure 10:
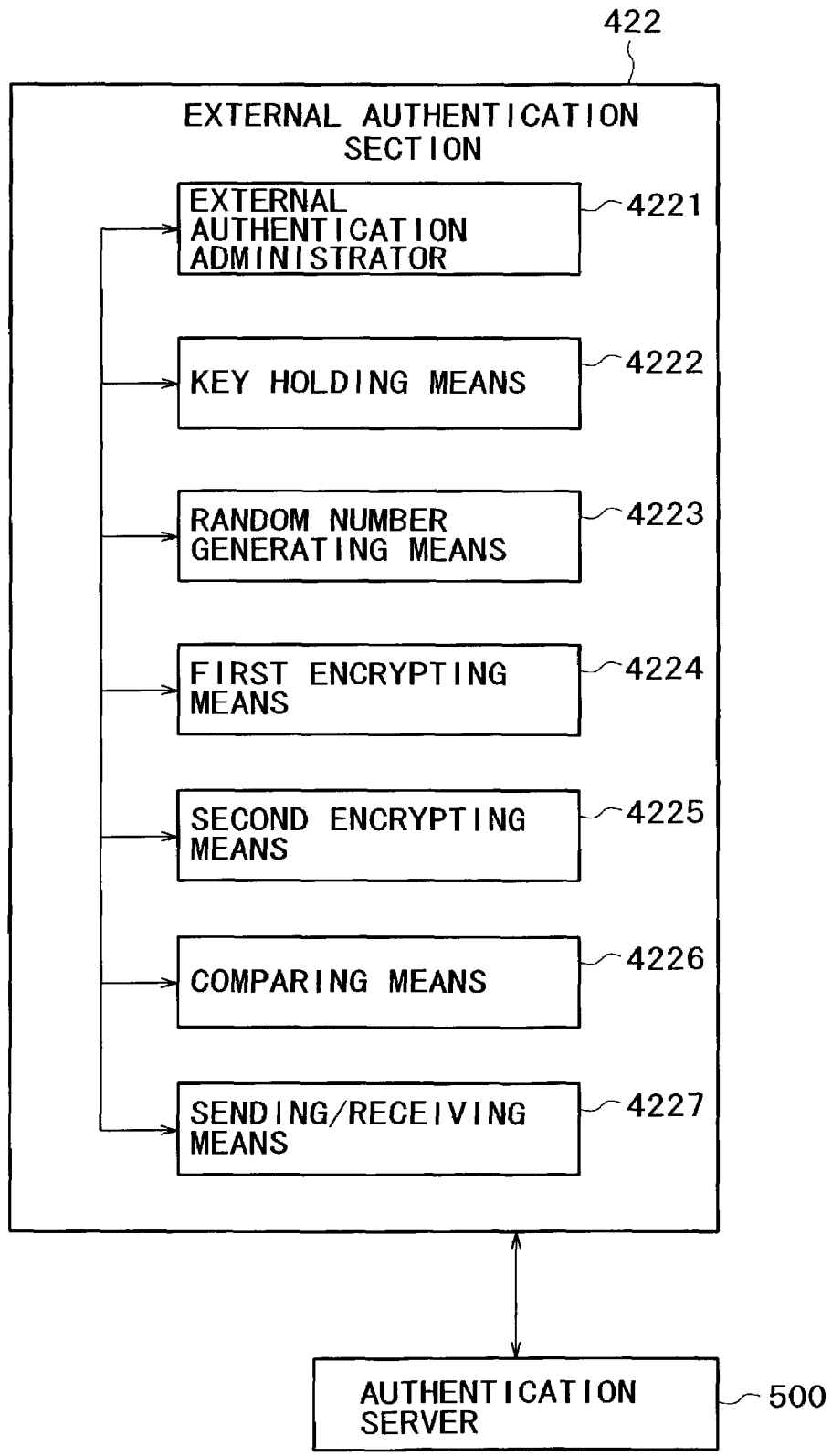
FIG. 10 is a block diagram showing the general structure of an external authentication section 422 of the data supply section 420.

As shown in FIG. 10, the external authentication section 422 mainly consists of an external authentication administrator 4221, key holding means 4222, random number generating means 4223, first encrypting means 4224, second encrypting means 4225, comparing means 4226, and sending/receiving means 4227.

External Authentication Administrator 4221

The external authentication administrator 4221 totally administers the operation of the external authentication section 422. The external authentication administrator 4221 carries out an external authentication process as mentioned later when the data supply section 420 is activated; when the result of the external authentication is successful, it transfers the work-in-process to the internal authentication section 424.

Key Holding Means 4222

The key holding means 4222 holds the first external authentication key (Kauth (1)) securely. The first external authentication key (Kauth (1)) is sent from the authentication server 500 to the data supply section 420 in advance; this first external authentication key (Kauth (1)) is hidden in the authenticating part (secure module) of the data supply section 420 in a tamper-resistant manner so that the key data cannot be easily detected even by reverse engineering.

Random Number Generating Means 4223

The random number generating means 4223 generates random numbers for external authentication. On one hand, the random numbers generated by the random number generating means 4223 are sent to the first encrypting means 4224 where they are encrypted using the first external authentication key (Kauth (1)), thus generating first encrypted data. On the other hand, they are sent to the second encrypting means 4225 where they are encrypted using the second external authentication key (Kauth (2)), generating second encrypted data.

First Encrypting Means 4224

The first encrypting means 4224 is basically software which is incorporated in the data supply section 420. The first encrypting means 4224 encrypts the random numbers generated by the random number generating means 4223 using the first external authentication key (Kauth (1)) held securely by the key holding means 4222 to generate first encrypted data.

Second Encrypting Means 4225

The second encrypting means 4225 encrypts the random numbers generated by the random number generating means 4223 in a route other than the one used for the first encrypting means 4224, using a second external authentication key (Kauth (2)) equal to the first external authentication key (Kauth (1)), to obtain second encrypted data.

The second encrypting means 4225 for obtaining second encrypted data may be embodied in various forms depending on the required security level.

Local External Authentication

A form of external authentication whose security level is lowest is as shown in FIG. 13 where external authentication is carried out in the data supply section 420. In this form, the second encrypting means 4225 is also incorporated in the data supply section 420 and the random numbers are encrypted using the second external authentication key (Kauth (2)) previously stored in the data supply section 420 to obtain second encrypted data.

However, this local form of external authentication has the risk that the second external authentication key (Kauth (2)) might be stolen by a person who operates the information terminal 400 maliciously. In addition, if the information terminal 400 itself is stolen, it is possible to download the package stored in the information terminal 400. Therefore, this local form of external authentication is effective only when the information terminal is of the antitheft type or designed so that the data in it is destroyed if it is stolen. The external authentication process for this local form of embodiment as illustrated in FIG. 13 will be described later.

Remote External Authentication

On the other hand, a form of external authentication whose security level is highest is as shown in FIG. 14. This is a remote form of embodiment in which external authentication is carried out using the authentication server 500 which is outside the data supply section 420. In this remote form, the authentication server 500 receives the above-said random numbers and encrypts them using the second external authentication key (Kauth (2)) to generate second encrypted data.

Therefore, there is no risk of the second external authentication key (Kauth (2)) being stolen. Even if the information terminal 400 is stolen, it is impossible to download the package stored in the information terminal 400. The external authentication process for the remote form of embodiment as illustrated in FIG. 14 will be described later.

Semi-Local External Authentication

FIG. 15 shows a form of external authentication which lies midway between the one shown in FIG. 13 and the one shown in FIG. 14. In this semi-local form, the authentication server 500 temporarily transfers the external authentication key (Kauth (2)) to the data supply section 420 when necessary, for example, when downloading. The data supply section 420 encrypts the random numbers using the second external authentication key (Kauth (2)) transferred from the authentication server 500 to generate second encrypted data. After generation of the second encrypted data, or whenever the information terminal 400 is turned off, the second external authentication key (Kauth (2)) is deleted from the data supply section 420.

In this form of embodiment, the second external authentication key (Kauth (2)) is temporarily transferred to the information terminal 400 only when necessary (downloading, etc), and therefore the risk of the second external authentication key (Kauth (2)) being stolen is remarkably reduced. When the second external authentication key (Kauth (2)) is designed to be deleted whenever the information terminal 400 is turned off, it is impossible to download the package stored in the terminal 400 even if it is stolen. The external authentication process for the semi-local form of embodiment as illustrated in FIG. 15 will be described later.

Comparing Means 4226

The comparing means 4226 compares the first encrypted data generated by the first encrypting means 4224 and the second encrypted data generated by the second encrypting means 4225. As a result of this comparison, if it is found that the first encrypted data coincides with the second encrypted data, external authentication is successfully completed.

Sending/Receiving Means 4227

The sending/receiving means 4227 sends or receives data in the external authentication section 422. The sending/receiving means 4227 sends, for example, the random numbers generated by the random number generating means 4223 to the outside, or receives the second encrypted data obtained by the second encrypting means 4225 from the authentication server 500.

Internal Authentication Section 424

Figure 11:
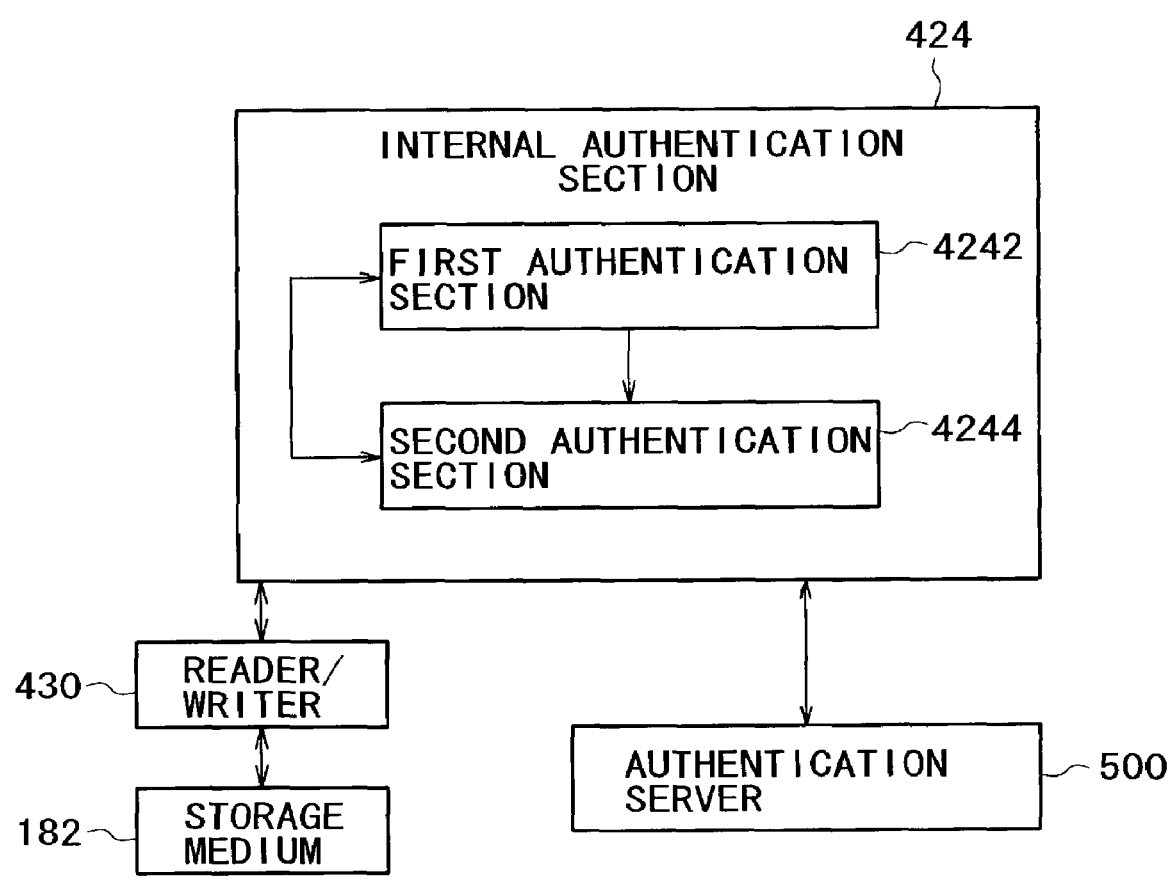
FIG. 11 is a block diagram showing the general structure of an internal authentication section 424 of the data supply section 420.

The internal authentication section 424 carries out internal authentication after completion of external authentication in the data supply section 420. The internal authentication section 424 consists of a first authentication section 4242 and a second authentication section 4244 as shown in FIG. 11.

First Authentication Section 4242

The first authentication section 4242 provides means to check if the content data to be distributed has been generated by a legal authoring system (authoring studio 300). More particularly, the MAC written into the content data by a legal authoring system is checked for the first authentication.

The MAC is calculated from the usage condition data as part of the additional data for the main content data using the content key (Kc). This means that unless the content key (Kc) and the root key (Kroot) are known, the MAC cannot be calculated, namely, only a person who has been given the data supply section 420 and the authoring key (CED) can create package data.

Second Authentication Section 4244

The second authentication section 4244 provides means for performing a mutual check between the reader/writer 430 as a recording means and the data supply section 420 as a data record control means. The second authentication section 4244 first transfers the content enabling key (EKB), which is obtained by encrypting the root key (Kroot) using the device key (Kdevice) in the legal authoring system 300, to both the reader/writer 430 and the data supply section 420. The reader/writer 430 and the data supply section 420 use their respective device keys (Kdevice), which they securely hold, to decrypt the root keys (Kroot). When the decrypted root keys coincide with each other, an affirmative authentication is made (the authenticity is proven).

Reproduction Controller 428

The reproduction controller 428 enables content data to be reproduced in a given storage medium such as a memory stick for which, as a result of internal authentication, the root key (Kroot) is proven to be shared. The reproduction controller 428 is designed so that if the reader/writer 430 is of the type which records plural contents in a storage medium collectively, the plural contents can be reproduced after the recording of all of the contents has been completed.

Reader/Writer (R/W) 430

The reader/writer (R/W) 430 is hardware which is used to download content data into a storage medium, such as a memory stick, memory card or smart media. As previously explained, before downloading, a mutual check between the data supply section 420 and the reader/writer (R/W) 430 is done for internal authentication to confirm that the device concerned is legal.

Sales Administrator 440

The sales administrator 440 administers various tasks to be performed for sale of packaged contents. The sales administrator 440 controls sales records and collects sales data. The sales administrator 440 collects statistical data by categorizing sales data according to, for example, time zone, sex, age group, price, content genre, sales quantity and other factors. This statistical data will be useful for product development in the future.

Billing Controller 450

The billing controller 450 controls billing-related tasks which have to be done for the sale of a packaged content. For example, when the user pays in cash, the billing controller 450 controls checkout operation (change, etc). It also controls personal identification or credit inquiries when the user pays by credit card.

Database 460

The database 460 stores and administers various kinds of information concerning the information terminal 400. The information which is stored in the database 460 includes packaged contents to be distributed by the information distribution system 100 according to the present invention, and various records such as sales records and billing records.

2.2.4 Authentication Server 500

The authentication server 500 performs external authentication to check if an information terminal 400 is a legal terminal which is authorized to download content data. In the information distribution system 100 according to the present invention, it is necessary to perform external authentication before downloading a given packaged content in order to check if the data supply section 420 of the information terminal 400 is a legal device authorized to download it.

The authentication server 500 has a function to perform external authentication of the data supply section 420. For external authentication, in the data supply section 420, the random numbers generated by the random number generating means 4223 are encrypted using the first external authentication key (Kauth (1)) securely held within the key holding means 4222 to generate first encrypted data, which will be mentioned later. The first external authentication key (Kauth (1)) is sent from the authentication server 500 to the data supply section 420 beforehand; this external authentication key (Kauth (1)) is hidden in the authenticating part (secure module) of the data supply section 420 in a tamper-resistant manner so that the key data cannot be easily detected even by reverse engineering.

On the other hand, in another route, similar random numbers are encrypted using a second external authentication key (Kauth (2)) equal to the first external authentication key (Kauth (1)) to obtain second encrypted data. Then, a comparison is made between the first encrypted data generated in the data supply section 420 and the second encrypted data generated in a route other than the one used for the first encrypted data. As a result of the comparison, if it is found that both encrypted data coincide with each other, the data supply section 420 is proven to be legal (external authentication).

The authentication server 500 basically controls the second external authentication key (Kauth (2)) in the above external authentication process. As described later, in one embodiment, the authentication server 500 receives the above random numbers and generates the second encrypted data using the second external authentication key (Kauth (2)). In another embodiment, the authentication server 500 transfers the second external authentication key (Kauth (2)) to the data supply section 420 to generate the second encrypted data. In a further embodiment in which the second external authentication key (Kauth (2)) is held securely in the data supply section 420, the authentication server 500 distributes the second external authentication key (Kauth (2)) in advance.

Regarding the first and second external authentication keys (Kauth (1)), (Kauth (2)) to be controlled by the authentication server 500, it is also possible to place an authorized key control unit 160 in charge of their issuance and management. The key control unit 160 not only issues the first and second external authentication keys (Kauth (1)), (Kauth (2)), but also can update the first and second external authentication keys (Kauth (1)), (Kauth (2)) and disable the data supply section 420 if the information terminal 400 is stolen.

2.2.5 Network 600

The network 600 is a communication network which distributes content data packaged in the authoring studio 300 to the information terminal 400. The network 600 includes both a radio communication network 600a, such as a satellite communication network, and a dedicated network 600b. For security, it is desirable that the network 600 be a closed system comprising a dedicated network 600b, but the use of an open system like the Internet is acceptable. If the network distributes data to many information terminals 400 simultaneously, it is desirable that it be a radio communication network 600a like a satellite communication network.

2.3 Key Control Unit 160

The key control unit 160 is an administrator authorized to control keys for use at various stages in the information distribution system according to the present invention. The key control unit 160 serves as an authoring key generator for the authoring device 316. The keys and key-related data to be controlled here are described below. The key data is updated periodically or when necessary in order to accommodate environmental change and improve security.

2.3.1 Key Data for Use in the Authoring Studio 300

The content key (Kc) is a key used to encrypt a content in the authoring studio 300. The content key (Kc) is encrypted using the root key (Kroot) to become the second content key (EKc).

The content identifier (CID) is an identifier allocated to each content. The content ID (CID) is unique to a content and is never allocated to any other content. The content identifier (CID) is generated and controlled not at the site of authoring work but in the authoring key generator 160 so that the uniqueness of the content identifier (CID) can be fully guaranteed.

The root key (Kroot) is a key which is used when the content key (Kc) is encrypted. The root key (Kroot) is sometimes called a "content key encrypting key." The root key (Kroot) is a very important key which is shared. In this system, this root key (Kroot) is not directly given to the authoring device 316, but a key set which consists of a content key (Kc) and a second content key (EKc) as encrypted by the root key is transferred to the authoring device 316 as an authoring key (CED) so that security is improved and a wrong key combination can be prevented.

The "second content key (EKc) as encrypted by the root key" is an encrypted form of the content key (Kc) made using the root key (Kroot). In short, the relation of EKc=E (Kroot, Kc) exists. When an authoring key (CED) is generated as a key set comprising a content key (Kc) and a second content key (Ekc) as encrypted by the root key, a wrong key combination can be prevented.

The device key (Kdevice) is key data concerning a reproducing device capable of using a packaged content. The device key is key data securely held by hardware or tamper-resistant software of each reproducing device.

The content enabling key (EKB (Enabling Key Block)) is an encrypted form of the root key (Kroot) made using the device key (Kdevice). The content enabling key (EKB) contains data such as E (KdeviceA, Kroot) and E (KdeviceB, Kroot); a reproducing device A (DeviceA) can know Kroot by solving E (KdeviceA, Kroot). Likewise, a reproducing device B (DeviceB) can know Kroot by solving E (KdeviceB, Kroot).

The authoring key enabling key (CEK (Content Enabling Key)) is confidential information (key) shared between a content authoring company and an administrator. It varies from one authoring company to another and is issued and controlled by the administrator. It is used together with the authoring key (CED) for authoring.

The authoring key (CED (Content Enabling Data)) is a key which is used to author a content. It is issued and controlled by an authorized administrator. It is associated with a content identifier (CID) and one content is authored using one authoring key (CED). The authoring key is made by encrypting a content key (Kc) and a second content key (EKc) as encrypted by the root key using the content identifier (CID) and the authoring key enabling key (CEK).

The redundant content key block (RKcB (Redundant Kc Block)) is a data block which combines the content key (Kc), second content key (EKc) as encrypted by the root key, and content enabling key version data (EKB-Version), and also has redundant random number data which makes illegal decryption difficult. It is generated in the course of generating the authoring key (CED). It is data which is used in the authoring key (CED) generating process and the user or a person who develops an application is unaware of it.

The redundant content key block with checksum data (CRKcB) is a data block which is obtained by calculating a checksum (CS) for the redundant content key block (RKcB) and adding it to the block.

The final encrypting key (Kcid) is key data which is used for final encryption in the authoring key (CED) generating process. It is made from the content ID (CID) and authoring key enabling key (CEK). Since the final encrypting key (Kcid) is data which is used in the authoring key (CED) generating process, the user or a person who develops an application is unaware of it. When using the authoring key (CED), if the content identifier (CID) and the authoring key enabling key (CEK) are known, the content key (Kc), second content key (EKc) as encrypted by the root key, and content enabling key version data (EKB-Version) which are contained in the authoring key (CED) can be acquired by generating Kcid within the module.

2.3.2 Key Data and Key-Related Data for Use in the Information Terminal 400

In the information terminal 400, key data and key-related data are used for decryption, external authentication or internal authentication of encrypted content data (E (Kc, Content)).

Data for Decryption

The encrypted content data (E (Kc, Content)) is decrypted using the device key (Kdevice), the content enabling key (EKB) and the content key (Kc) as obtained from the second content key (EKc).

Key Data for External Authentication

For external authentication of the data supply section 420, the first external authentication key (Kauth (1)) and the second external authentication key (Kauth (2)) are used.

The first external authentication key (Kauth (1)) is distributed from the authentication server 500 to the data supply section 420 beforehand. This external authentication key (Kauth (1)) is hidden in the authenticating part (secure module) of the data supply section 420 in a tamper-resistant manner so that the key data cannot be easily detected even by reverse engineering. The first external authentication key (Kauth (1)) is used when the first encrypting means 4224 encrypts random numbers to generate first encrypted data.

The second external authentication key (Kauth (2)) is equal to the first external authentication key (Kauth (1)) which is issued by the authentication server 500. The second external authentication key (Kauth (2)) is used when the second encrypting means 4225 encrypts random numbers to generate second encrypted data.

Key Data for Internal Authentication

For internal authentication of the data supply section 420, reference is made to the root key (Kroot) which is obtained by decrypting the content enabling key (EKB) using the device key (Kdevice) which the data supply section 420 and the reader/writer 430 each have.

2.4 User Device 180

The user device 180 is an information terminal such as a computer which has a function to access an information terminal 400 (kiosk terminal, etc) and download a desired content.

As illustrated in FIG. 1, the user device 180 mainly consists of a storage medium 182 and a reproducing device 184. The user device 180 may also be provided with another storage medium and/or reproducing device 186. It can check out or move the content downloaded into the storage medium 182 to another storage medium and/or reproducing device 186 repeatedly as many times as allowed.

3. Authoring Process

Next, the authoring process in the authoring studio 300 will be described. The information distribution system 100 according to the present invention is characterized in that encryption and packaging of a content are done in the authoring process, that the authoring key generator 160 which generates an authoring key is separate from the authoring device 316 which actually encrypts the content using the authoring key, and that the content can be encrypted without directly giving the root key to the authoring device 316.

Because it is unnecessary to know the content of the authoring key in authoring, the step of authoring key generation can be completely separated from the authoring process. Furthermore, this separation makes it possible to control the number of packages which can be generated correctly in the authoring process from outside the process.

Besides, when an authoring key enabling key (CEK) which is arbitrarily specified for authoring key generation is added to the content identifier (CID) as an encrypting key for use in authoring key generation, it is possible to limit who can use the generated authoring key correctly to a person who knows the authoring key enabling key (CEK).

Tampering of a package can be prevented by adding the MAC, based on a key which only legal systems can know, to usage condition data, etc. which is set in the authoring process.

3.1 Authoring Key Generation Process

The authoring key generating process in the authoring key generator (key control unit) 160 is described below.

The authoring key (CED) basically contains a content key (Kc) and a second content key (EKc) as encrypted by the root key. EKc may be expressed as E (Kroot, Kc). The root key (Kroot) is a key which is used to encrypt the content key (Kc). The root key (Kroot) is a very important key for security. As described later, in this system, this root key (Kroot) which is shared is not directly given to the authoring device 316. Rather, a key set which consists of a content key (Kc) and a second content key (EKc) as encrypted by the root key is transferred to the authoring device 316 as an authoring key (CED) so that security is improved and a wrong key combination can be prevented.

Figure 17A:
FIG. 17A illustrates the authoring key generating process and FIG. 17B illustrates the process of obtaining a content key and a second content key from an authoring key in the information distribution system 100.

As illustrated in FIG. 17A, an authoring key (CED) is obtained by encrypting a content key (Kc) for encryption of the content data and a second content key (EKc) as encrypted by the root key (Kroot) using the content identifier (CID) and the authoring key enabling key (CEK), where the content identifier (CID) is uniquely allocated to each of the content data (Content) and the authoring key enabling key (CEK) is uniquely allocated to each authoring device 316.

For generation of an authoring key (CED), the authoring key generating means 166 (FIG. 6) requires a content identifier (CID) generated by the content identifier generating means 162, a content key (Kc), a second content key (EKc) as encrypted by the root key (Kroot), and an authoring key enabling key (CEK) generated by the authoring key enabling key generating means 164.

FIG. 16 is a flowchart showing the authoring key (CED) generating process in the authoring key generating means 166.

First, at step S1602, a redundant content key block (RKcB (Redundant Kc Block)) is generated as a data block by combining the content key (Kc), the second content key (EKc) as encrypted by the root key, and content enabling key version data (EKB-Version), which are all to be contained in the authoring key (CED), and adding redundant random number data which makes illegal decryption difficult.

The content enabling key (EKB) is an encrypted form of the root key (Kroot) which is made using the device key (Kdevice), and the content key enabling key version data (EKB-Version) is version data on the content enabling key. In this way, data which shows the version of the root key (Kroot) to be specified for a certain content key (Kc) is included in the key set, so a wrong combination of the content key (Kc), second content key (EKc) as encrypted by the root key, and the root key (Kroot) can be prevented.

Next, at step S1604, a checksum (CS) is calculated for the redundant content key block (RKcB) and the checksum (CS) is added, for example, after the redundant content key block (RKcB) to obtain a redundant content key block with checksum data (CRKcB).

Thus, adding the checksum data in addition to the content key (Kc) and second content key (EKc) as encrypted by the root key in the authoring key (CED) generating process virtually prevents an authoring key (CED) with a wrong content identifier (CID) from being used.

Figure 17B:

Next, step S1606 generates a final encrypting key (Kcid) from the content identifier (CID) and the authoring key enabling key (CEK). As described later in connection with FIG. 17B, when using the authoring key (CED), if the content identifier (CID) and the authoring key enabling key (CEK) are known, the content key (Kc), second content key (EKc) as encrypted by the root key, and content enabling key version data (EKB-Version) which are contained in the authoring key (CED) can be acquired by generating Kcid within the module.

In the final encrypting key (Kcid) generating process, allocating a unique content identifier (CID) to each content permits the use of a correct content identifier (CID) in encryption by the authoring key to ensure correct authoring work. This enables authoring accuracy to increase. Also, controlling the generation of the content identifier (CID) in the authoring key generator 160 enables the uniqueness of the content ID (CID) to be fully guaranteed.

Finally, at step S1608, an authoring key (CED) is generated by encrypting the redundant content key block with checksum data (CRKcB) using the final encrypting key (Kcid).

3.2 Encryption by the Authoring Key

Figure 18:
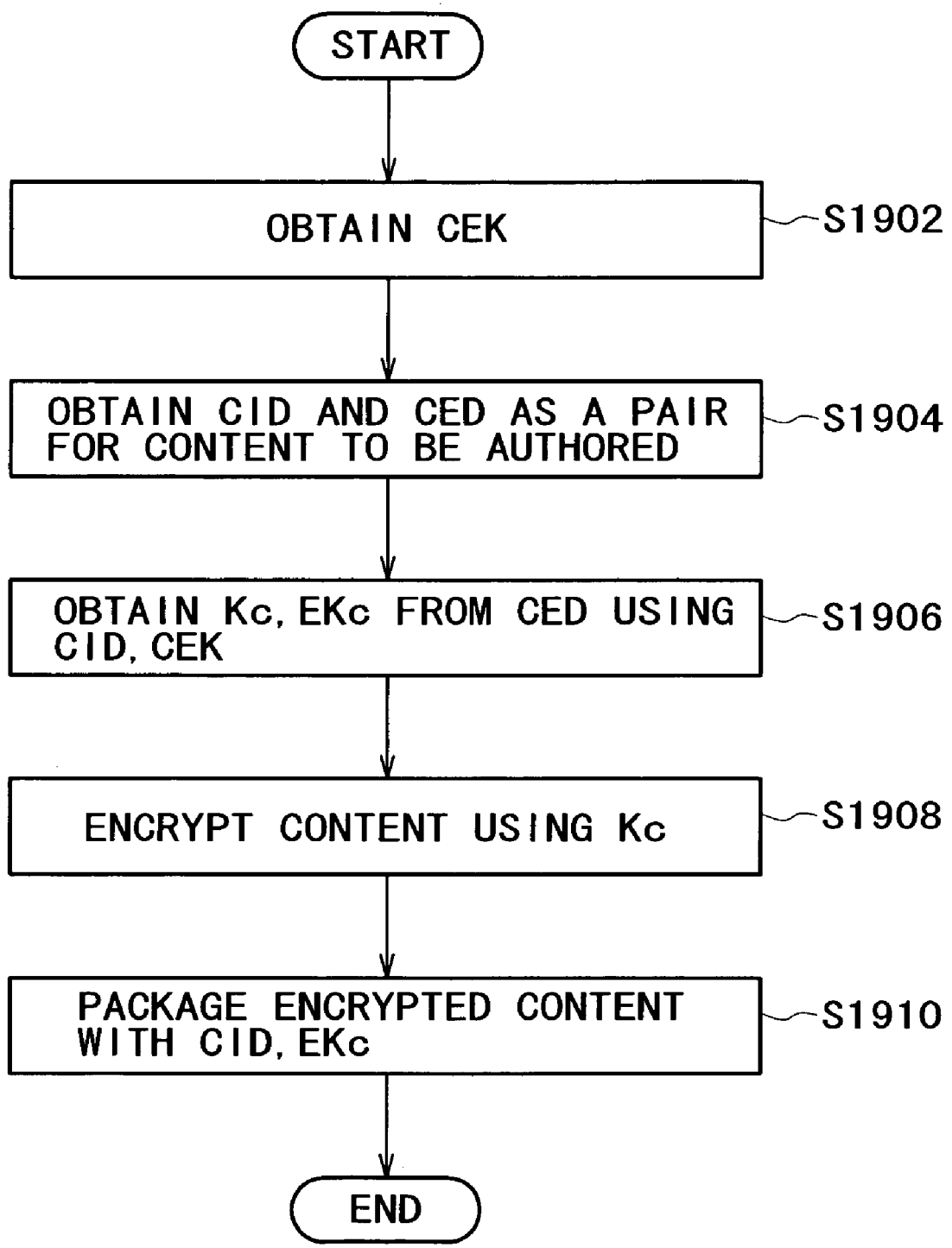
FIG. 18 is a flowchart showing the authoring process in the information distribution system 100.

Next, referring to FIG. 18, how a content is encrypted using the authoring key generated by the authoring key generator 160 is explained.

First, at step S1902, the content key decrypting means 3162 of the authoring device 316 acquires an authoring key enabling key (CEK) as a shared confidential key from the authoring key generator (key control unit) 160. Although the explanation given below assumes that the authoring key generator also serves as a key control unit responsible for control of the authoring key and other key data, it is also possible that the authoring key generator and the key control unit are separate devices.

Next, at step S1904, the content key decrypting means 3162 acquires from the authoring key generator (key control unit) 160 a content identifier (CID) and an authoring key (CED) as a pair for a content to be authored.

In connection with steps S1902 and S1904, the authoring key enabling key (CEK) need not be acquired at the same time when the pair (CID and CED) is acquired. While the pair (CID and CED) varies from one content to another, the authoring key enabling key (CEK) is unique to the authoring device 316; therefore once the authoring key enabling key (CEK) is acquired before the authoring process, no further operation to acquire it is necessary.

Also, it is not always necessary to acquire such a pair (a content identifier (CID) and an authoring key (CED)) every time to author each content. When plural contents are to be authored, arrangements may be made such that a pair for all the contents is acquired at one time.

Next, at step S1906, the content key decrypting means 3162 decrypts the content key (Kc) and the second content key (EKc) as encrypted by the root key from the authoring key (CED) using the content identifier (CID) and the authoring key enabling key (CEK).

Then, at step S1908, the content encrypting means 3164 of the authoring device 316 encrypts content data using the content key (Kc) decrypted by the content key decrypting means 3162 to generate encrypted content data E (Kc, Content).

After that, at step S1910, the packaging means 3166 bundles the encrypted content data E (Kc, Content), the content identifier (CID) and the second content key (EKc) as encrypted by the root key as a package to conclude the series of authoring steps.

4. Information Distribution Process

Figure 19:
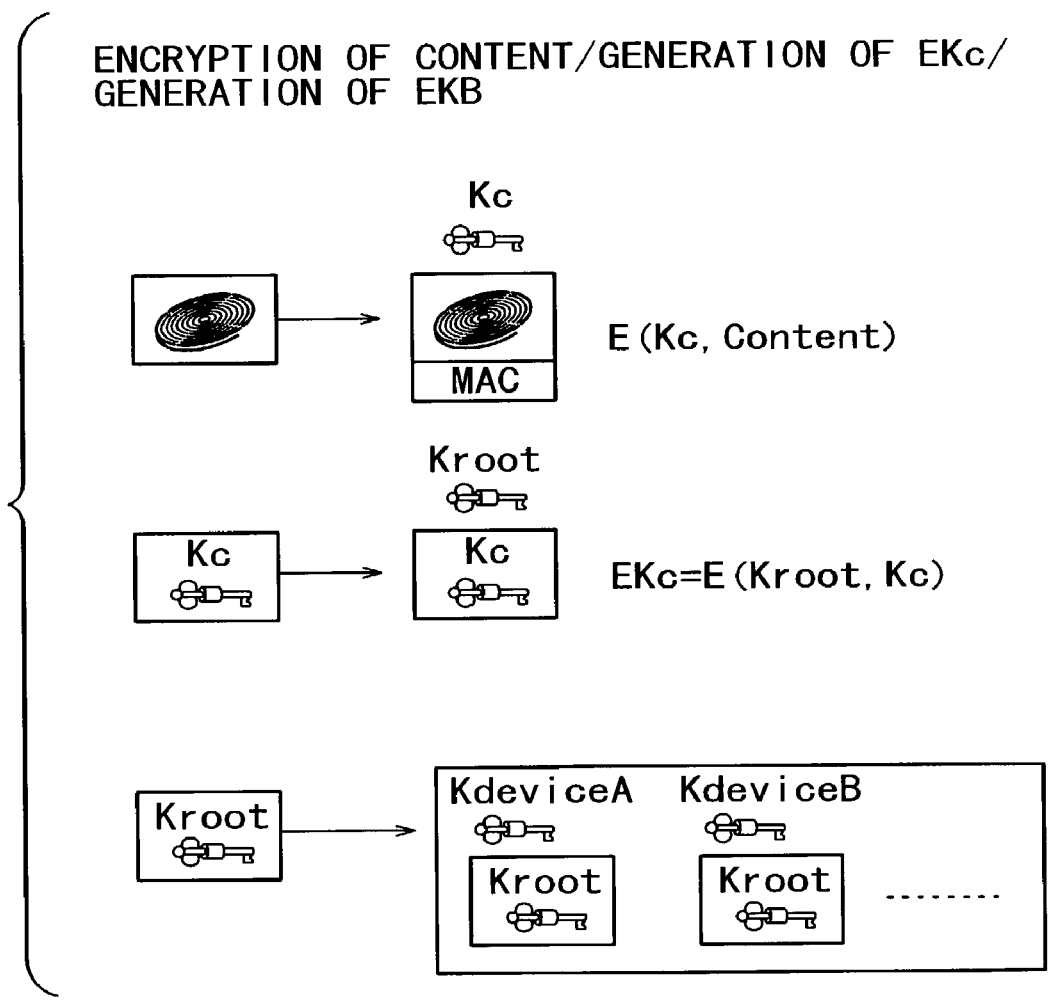
FIG. 19 illustrates how encrypted content data (E (Kc, Content)) to be distributed, a content key as encrypted by a root key (Ekc), and a content enabling key (EKB) are mutually related in the information distribution system 100.

The content for which authoring has been finished in this way is sent through the specified network 600 to the information terminal 400 (kiosk terminal, etc.), as shown in FIG. 1. As shown in FIG. 19, the encrypted content data (E (Kc, Content)), the second content key (EKc) as encrypted by the root key, and the content enabling key (EKB) are sent to the information terminal 400. In order to prevent tampering, the MAC which is calculated using the content key Kc is added to the header of the encrypted content data E (Kc, Content).

At the information terminal 400, after a specified authentication process comprising external authentication and internal authentication has been completed, the content data is decrypted and downloaded into a given storage medium 182. Referring to the flowchart in FIG. 20, the information distribution process is explained in detail below.

4.1 External Authentication Process

As mentioned earlier, the external authentication section 422 of the information terminal 400 checks if the data supply section 420 is legal, or authorized to supply the content stored in the information terminal 400 to the outside, by comparing the first external authentication key (Kauth (1)) previously stored in the data supply section 420 with the second external authentication key (Kauth (2)) stored in the authentication server 500 (step S2102). If the check for external authentication at step S2102 is successful, the process goes to step S2104 and subsequent steps for internal authentication; if the check is unsuccessful, distribution of content data (DL) is rejected (step S2112).

External authentication must be carried out whenever the data supply section 420 is activated. However, once its authenticity has been proven, no further external authentication is needed while the data supply section 420 is running.

The second encrypting means 4225 for obtaining second encrypted data may be embodied in various forms depending on the required security level.

4.1.1 Local External Authentication Process

A form of external authentication whose security level is lowest is as shown in FIG. 13; here external authentication is carried out locally or in the data supply section 420. In this form of external authentication, the second external authentication key (Kauth (2)) is incorporated in the application of the data supply section 420.

First, the secure module 425 which securely holds the first external authentication key (Kauth (1)) encrypts the random numbers generated by the random number generating means 4223 using the first external authentication key (Kauth (1)) to obtain first encrypted data.

The random numbers generated by the random number generating means 4223 are sent through an application interface 423 to an application 421. The application 421 encrypts the random numbers using the previously stored second external authentication key (Kauth (2)) to obtain second encrypted data.

The second encrypted data is sent back through the application interface 423 to the secure module 425. In the secure module 425, a comparison is made between the first encrypted data and the second encrypted data; if they coincide, the external authentication process according to the present invention is concluded.

However, this local form of external authentication has the risk that the second external authentication key (Kauth (2)) may be stolen by a person who operates the information terminal 400 maliciously. In addition, if the information terminal 400 itself is stolen, it is possible to download the package stored in the information terminal 400.

4.1.2 Remote External Authentication Process

On the other hand, a form of external authentication whose security level is highest is as shown in FIG. 14; herein external authentication is carried out remotely, or using the authentication server 500 which is outside the data supply section 420.

First, the secure module 425 which securely holds the first external authentication key (Kauth (1)) encrypts the random numbers generated by the random number generating means 4223 using the first external authentication key (Kauth (1)) to obtain first encrypted data.

The random numbers generated by the random number generating means 4223 are sent through an application interface 423 and through an application 421 to the authentication server 500. The authentication server 500 receives the random numbers to obtain second encrypted data using the second external authentication key (Kauth (2)).

The second encrypted data is sent back through the application interface 423 to the secure module 425. In the secure module 425, a comparison is made between the first encrypted data and the second encrypted data; if they coincide, the external authentication process according to the present invention is concluded.

Therefore, in this form of external authentication, there is no risk of the second external authentication key (Kauth (2)) being stolen; even if the information terminal 400 is stolen, it is impossible to download the package stored in the information terminal 400.

4.1.3 Semi-Local External Authentication Process

FIG. 15 shows a form of external authentication which lies midway between the one shown in FIG. 13 and the one shown in FIG. 14. In this form of external authentication, the authentication server 500 temporarily transfers the external authentication key (Kauth (2)) to the data supply section 420 when necessary, for example, when downloading.

First, the secure module 425 which securely holds the first external authentication key (Kauth (1)) encrypts the random numbers generated by the random number generating means 4223 using the first external authentication key (Kauth (1)) to obtain first encrypted data.

The random numbers generated by the random number generating means 4223 are sent through an application interface 423 to an application 421. The application 421 encrypts the random numbers using the previously stored second external authentication key (Kauth (2)) to obtain second encrypted data.

The second external authentication key (Kauth (2)) is under the control of the authentication server 500; whenever the data supply section 420 is activated, the application 421 receives the second external authentication key (Kauth (2)) from the authentication server 500 and encrypts the random numbers. After the generation of the second encrypted data, or whenever the information terminal 400 is turned off, the second external authentication key (Kauth (2)) is deleted from the data supply section 420.

The second encrypted data is sent back through the application interface 423 to the secure module 425. In the secure module 425, a comparison is made between the first encrypted data and the second encrypted data; if they coincide, the external authentication process according to the present invention is concluded.

In this form of external authentication, the second external authentication key (Kauth (2)) is temporarily transferred to the information terminal 400 only when necessary (downloading, etc.), and therefore the risk of the second external authentication key (Kauth (2)) being stolen is remarkably reduced. If the key (Kauth (2)) is thus designed to be deleted whenever the information terminal 400 is turned off, it is impossible to download the package stored in the information terminal 400 even if the information terminal 400 is stolen.

4.2 Internal Authentication Process

The internal authentication section 424 carries out internal authentication after completion of external authentication in the data supply section 420. The internal authentication process consists of a first authentication step where content data is checked by the first authentication section 4242 and a second authentication step by the second authentication section 4244.

Figure 20:
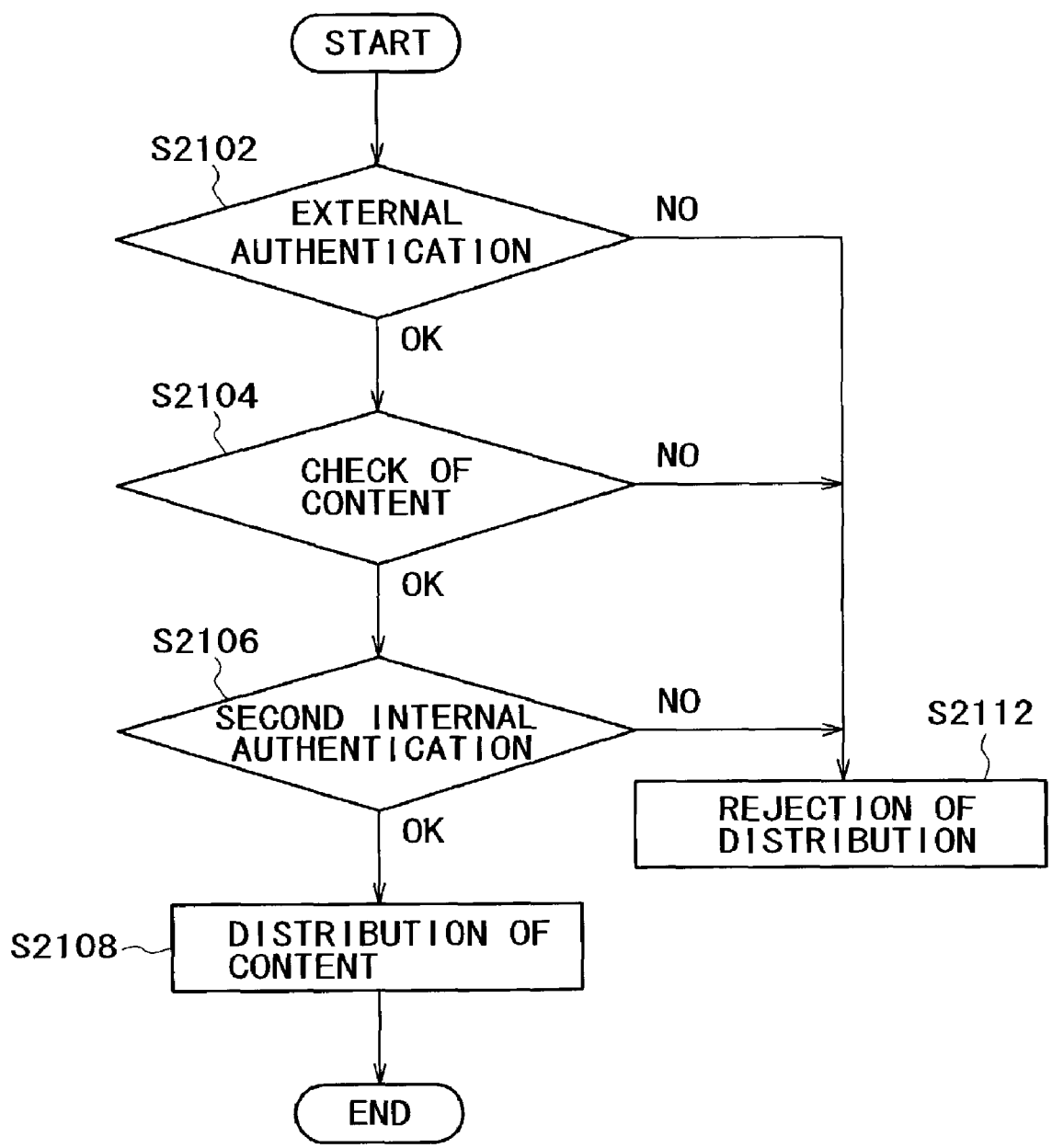
FIG. 20 is a flowchart showing the information distribution process in the information terminal 400.
Figure 21:
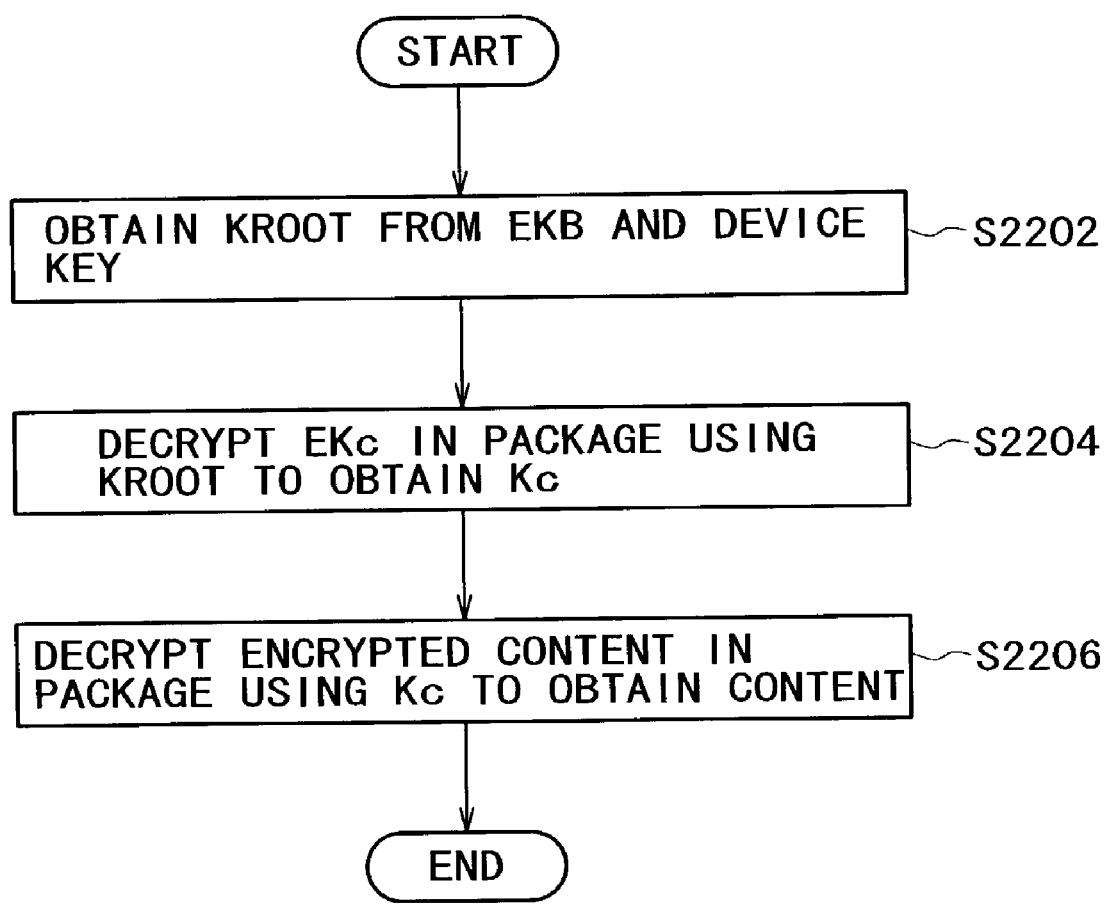
FIG. 21 is a flowchart showing the content decrypting process in the information terminal 400.

As shown in FIG. 20, the content check at step S2104 is a step to check if the content data to be distributed has been generated by a legal authoring system (authoring studio 300). More particularly, the first authentication refers to the MAC written into the content data by a legal authoring system. At step S2104, if the content check is successful, the process goes to step S2106 for the second internal authentication; if the content check is unsuccessful, distribution of content data (DL) is rejected (step S2112).

At step S2106, the second authentication section 4244 provides means for performing a mutual check between the reader/writer 430 as a recording means and the data supply section 420 as a data record control means. The second authentication section 4244 first transfers the content enabling key (EKB), which is obtained by encrypting a root key (Kroot) using a device key (Kdevice) in the legal authoring system 300, to both the reader/writer 430 and the data supply section 420. The reader/writer 430 and the data supply section 420 use their respective device keys (Kdevice), which they securely hold, to decrypt the root keys (Kroot). When the decrypted root keys coincide with each other, an affirmative authentication is made (the authenticity is proven). At step S2106, if the second internal authentication is successful, downloading at step S2108 is permitted; if the second internal authentication is unsuccessful, distribution of content data (DL) is rejected (step S2112).

4.3 Downloading Process

As shown in FIG. 20, after internal authentication has been completed in this way at step S2106, the content data is downloaded into a given storage medium such as a memory stick at step S2108.

Figure 22:
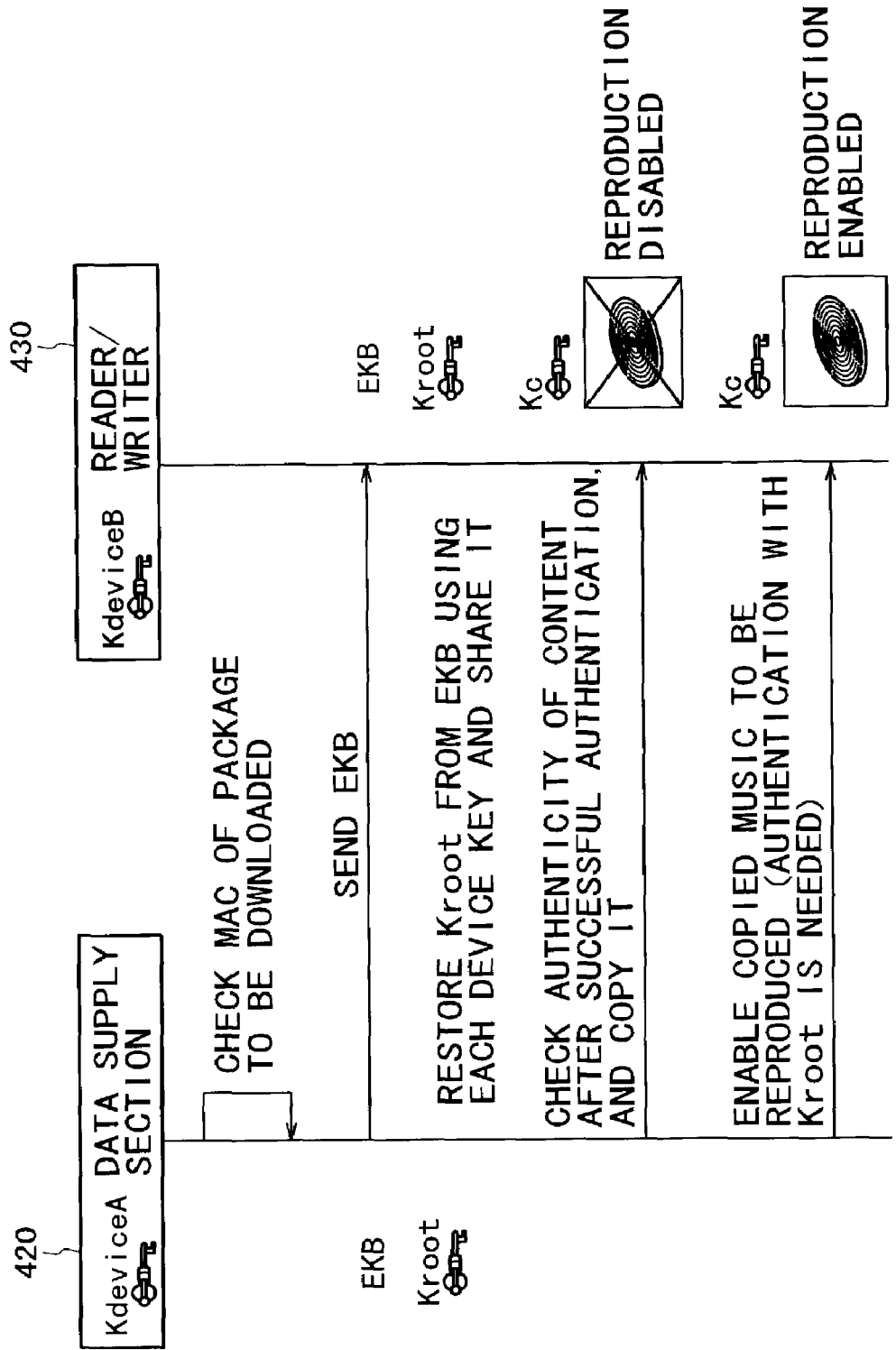
FIG. 22 is a flowchart showing the package downloading process in the information terminal 400.

Next, how the internal authentication, decryption and downloading processes are associated with each other is explained referring to FIG. 22.

First, the data supply section (device) 420, which securely holds the device key (KdeviceA), checks the MAC of the package to be downloaded and confirms that the package has been generated by a legal authoring system and has never been tampered with or otherwise modified.

The data supply section 420 obtains a root key (KrootA) by decrypting the content enabling key (EKB) contained in the package using the device key (KdeviceA). The data supply section 420 sends the content enabling key (EKB) to the reader/writer 430. The reader/writer 430 also holds the device key (KdeviceB) securely like the data supply section 420. The reader/writer 430 obtains a root key (KrootB) by decrypting the content enabling key received from the data supply section 420 using the device key (KdeviceB).

The data supply section 420 and the reader/writer 430 compare both root keys (KrootA, KrootB) for internal authentication. If the result of the comparison for internal authentication is successful, the authenticity of the content is checked and then the content is copied into a storage medium such as a memory stick by means of the reader/writer 430.

At this stage, the content remains encrypted by the content key (Kc) and cannot be reproduced. Therefore, the content (copy) is made reproducible using the content key (Kc) by a reproduction controller so that the user can reproduce and enjoy the content on his/her reproducing device 184.

4.4 Downloading Plural Contents Collectively

Although FIG. 22 shows the case in which one content is copied, the information distribution system according to the present invention permits plural contents to be downloaded at the same time.

Figure 23:
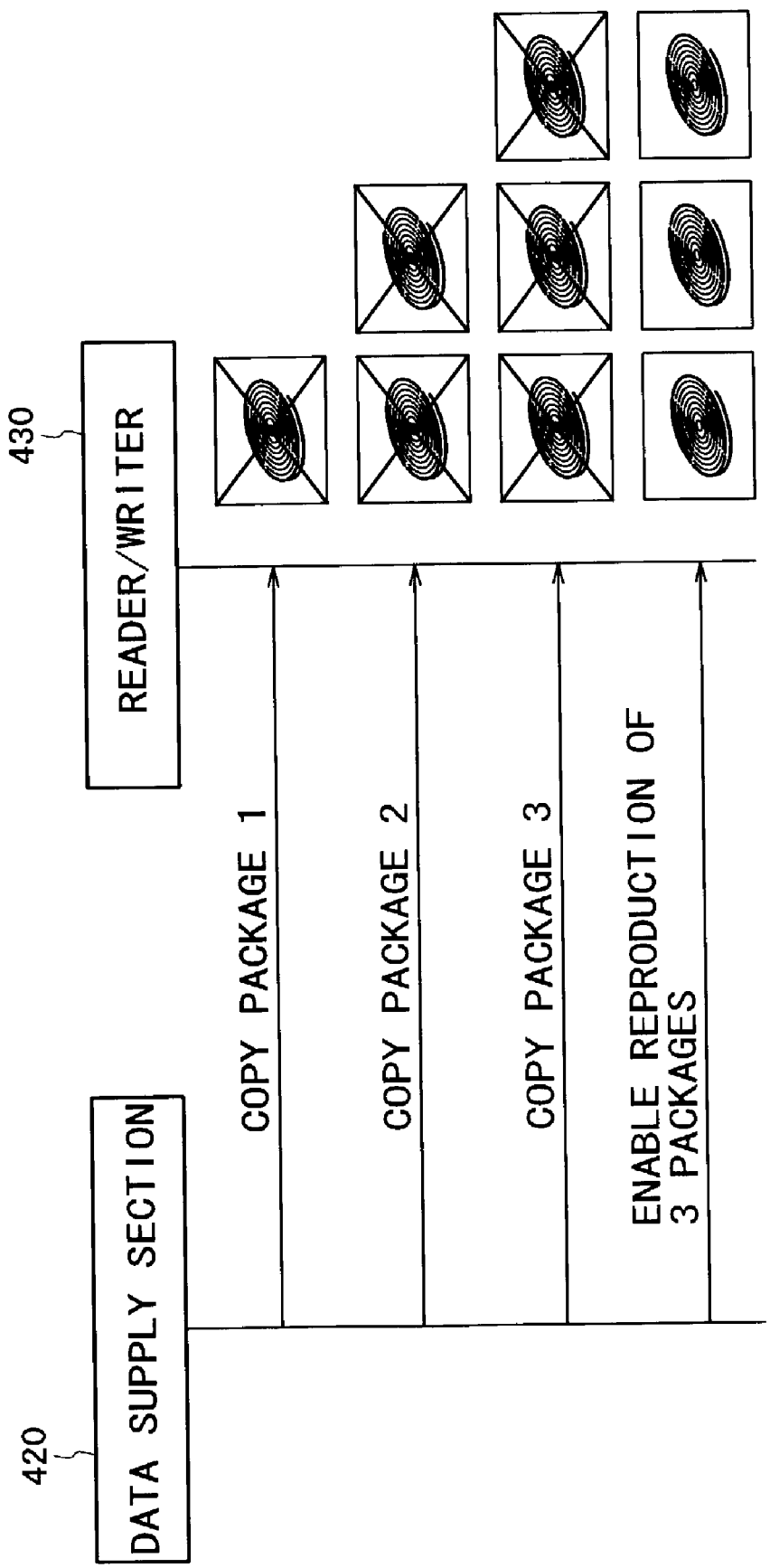
FIG. 23 is a flowchart showing the process of downloading plural packages collectively in the information terminal 400.

Next, how plural contents are downloaded collectively is explained referring to FIG. 23. After a prescribed series of authentication steps has been completed successfully, the data supply section (device) 420 copies the first package into a given storage medium 182 through the reader/writer 430. At this stage, the content in the first package cannot be reproduced. Then the data supply section 420 copies the second and third contents into the storage medium 182 through the reader/writer 430. After plural contents have been downloaded collectively in this way, the reproduction controller makes all the downloaded contents reproducible at one time.

As mentioned above, downloaded contents are made reproducible not one by one but collectively; for example, if there is a request for downloading of three tunes, the three tunes are copied and then made all reproducible collectively. This remarkably reduces the workload of authentication and other steps required for downloading plural contents.

4.5 Flow of a Downloaded Content

Figure 24:
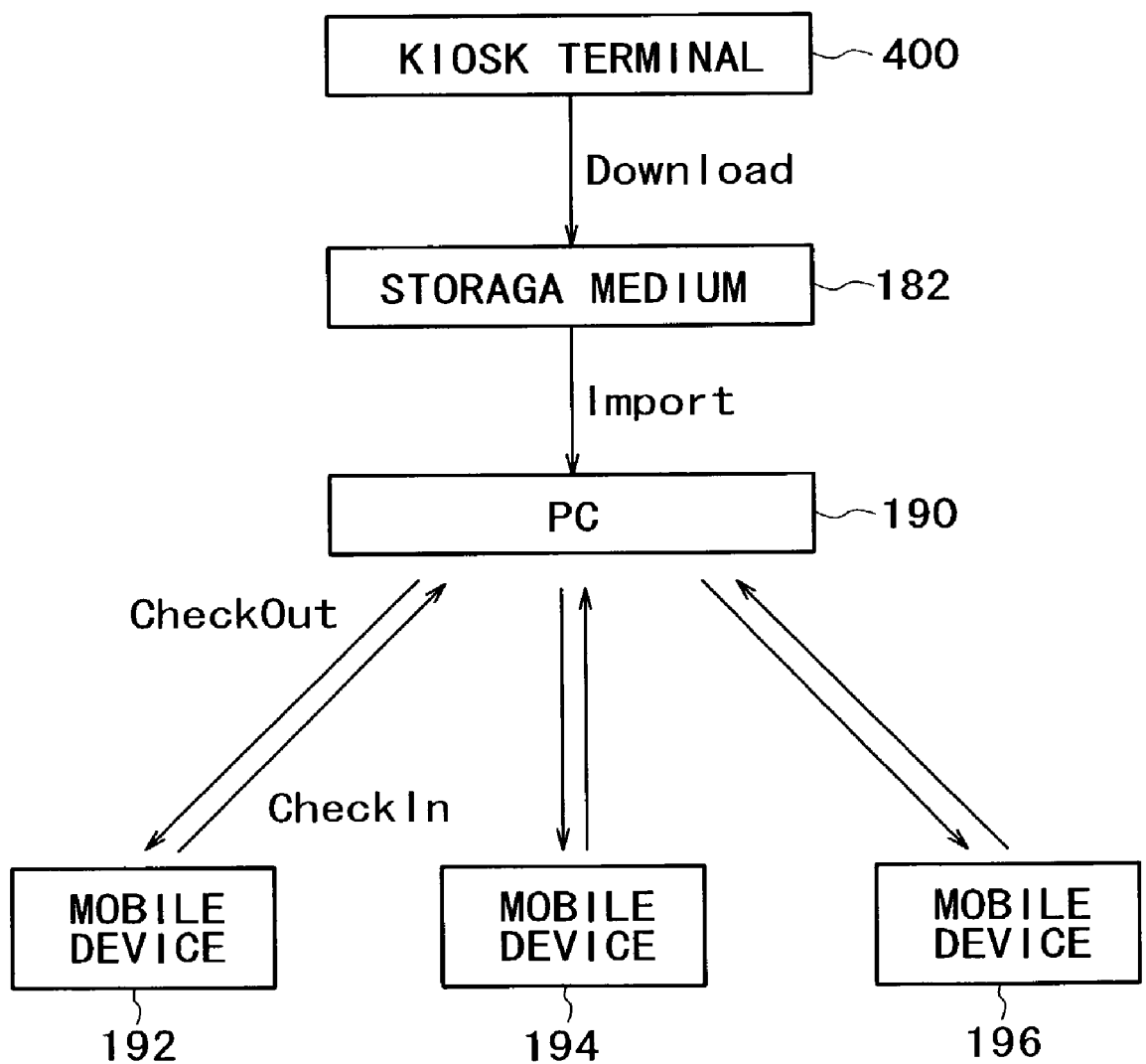
FIG. 24 illustrates how content, once downloaded, is processed in the information terminal 400.

Next, how a content flows after being downloaded by the information distribution system according to the present invention is explained referring to FIG. 24.

As shown in FIG. 24, in this system, a content package is downloaded into a storage medium such as a memory stick from a kiosk terminal (information terminal) 400. The package also contains content usage condition data; how the downloaded content is processed is determined according to this condition data.

Usually, the content is imported from the storage medium 182 (memory stick, etc) into terminal equipment 190 (personal computer, etc). Then the content can be checked out from the terminal equipment 190 to mobile devices 192, 194, 196 with a reproduction function. The number of checkouts is limited for the purpose of copyright protection. In the example shown here, up to three checkouts are allowed. Therefore, the downloaded content can be copied into three mobile devices 192, 194, 196.

If the user wishes to copy the content into a reproducing device other than the above mobile devices 192, 194, 196, it can be copied repeatedly within the allowable number of checkouts after being checked into the personal computer 190 from one of the mobile devices 192, 194, 196.

As discussed so far, in the information distribution system according to the present invention, the content is encrypted in the course of authoring so the downloading time at the information terminal can be shortened, thereby reducing the workload on the information terminal.

The information distribution system according to the present invention is designed so that only a content which is generated by a legal authoring device can be downloaded at the information terminal. This means that an illegal act such as manual rewriting of some of an authored content can be prevented. Also, an illegally authored content which is sent to the information terminal cannot be downloaded.

In the information distribution system according to the present invention, even if the content is legal, it cannot be reproduced from a simple copy of it which is made in the storage medium; only after completion of external authentication and internal authentication in the data supply device can it be reproduced. This prevents illegal copying.

In the information distribution system according to the present invention, a legally purchased content file can be downloaded as many times as desired and a legally downloaded content file can be moved to a PC where a checkout to another device or a checkin to it can be made.

In the information distribution system according to the present invention, additional data such as jacket picture data can also be processed together and in association with the main content data such as a music file.

The above preferred embodiments assume that an information distribution system according to the present invention is used as a system which distributes music data as contents. However, the invention is not limited to such an application. It is needless to say that the system can be used as an information distribution system which distributes, for example, image (still image and animated image) data, game programs and other various types of content data in addition to music data through a network to users.

As can be understood from the foregoing explanation, the present invention provides an information distribution system which distributes music data and other various types of content data while preventing illegal copying effectively. In other words, according to the present invention, it is possible to effectively prevent unauthorized authoring, unauthorized data distribution, unauthorized use of an information terminal, and unauthorized downloading. Furthermore, according to the present invention, data is compressed and encrypted so that an information distribution system which features shorter downloading time can be realized.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An authoring system for authoring content data (Content), comprising:
   an authoring device; and
   an authoring key generator including:
      means for generating a content identifier (CID) uniquely allocated to each of the content data (Content);
      means for generating an authoring key enabling key (CEK) uniquely allocated to the authoring device for authoring the content data (Content); and means for generating an authoring key (CED) by encrypting a content key (Kc) and a second content key (EKc) with the content identifier (CID) and the authoring key enabling key (CEK), the content key (Kc) being for encrypting the content data (Content), and the second content key (Ekc) being obtained by encrypting the content key with a root key (Kroot);

the authoring device including:

means for receiving the content identifier (CID), authoring key enabling key (CEK) and the authoring key (CED) from the authoring key generator;

means for storing content corresponding to the content identifier (CID);

means for storing the content identifier (CID), authoring key enabling key (CEK) and the authoring key (CED);

means for decrypting the authoring key (CED) with the content identifier (CID) and the authoring key enabling key (CEK) to obtain the content key (Kc) and the second content key (EKc); and means for encrypting the content data (Content) with the decrypted content key (Kc) to generate encrypted content data (E (Kc, Content)).

2. The authoring system as claimed in claim 1, further comprising packaging means for bundling the encrypted content data (E (Kc, Content)), the content identifier (CID), and the second content key (EKc) as a package.

3. The authoring system as claimed in claim 1, wherein the content key (Kc) is obtained from the second content key (EKc) and the root key (Kroot), the content key (Kc) enabling decryption of the encrypted content data (E (Kc, Content)) and reproduction of the content data (Content) in a reproducing device holding the root key (Kroot) securely.

4. The authoring system as claimed in claim 3, wherein the root key (Kroot) is incorporated in a content enabling key (EKB) encrypted by a device key (Kdevice) associated with the reproducing device, and the authoring key (CED) further includes the encrypted content enabling key (EKB).

5. The authoring system as claimed in claim 1, wherein the authoring key (CED) further includes encrypted checksum data.

6. The authoring system as claimed in claim 1, further comprising nullifying means for, upon updating of the authoring key (CED), nullifying the authoring key (CED) which has not been updated.

7. The authoring system as claimed in claim 1, wherein the content data (Content) consists of main content data and additional data for the main content data.

8. A method for generating an authoring key for authoring content data (Content), the method comprising:

generating a content identifier (CID) uniquely allocated to each of the content data (Content);

generating an authoring key enabling key (CEK) uniquely allocated to an authoring device for authoring the content data (Content); and generating an authoring key (CED) by encrypting a content key (Kc) and a second content key (EKc) with the content identifier (CID) and the authoring key enabling key (CEK), the content key (Kc) being for encrypting the content data (Content), and the second content key (EKc) being obtained by encrypting the content key with a root key (Kroot).

9. An authoring device for authoring content data (Content), comprising:

means for storing the content data (Content);

means for storing key data, the key data including:

a content identifier (CID) uniquely allocated to each of the content data (Content);

an authoring key enabling key (CEK) uniquely allocated to the authoring device; and an authoring key (CED) obtained by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot);

means for receiving the content identifier (CID), authoring key enabling key (CEK) and the authoring key (CED) from an authoring key generator;

means for storing content corresponding to the content identifier (CID);

means for decrypting the authoring key (CED) with the content identifier (CID) and the authoring key enabling key (CEK) to obtain the content key (Kc) and the second content key (EKc); and means for encrypting the content data (Content) with the decrypted content key (Kc) to generate encrypted content data (E (Kc, Content)).

10. The authoring device as claimed in claim 9, further comprising packaging means for bundling the encrypted content data (E (Kc, Content)), the content identifier (CID) and the second content key (EKC) as a package.

11. The authoring device as claimed in claim 10, wherein the packaging means adds fringe data for the content data (Content) to the package.

12. The authoring device as claimed in claim 9, wherein the authoring key (CED) is encrypted by an authorized authoring key generator which is separate from the authoring device.

13. The authoring device as claimed in claim 9, wherein the content key (Kc) is obtained from the second content key (EKc) and the root key (Kroot), the content key (Kc) enabling decryption of the encrypted content data (E (Kc, Content)) and reproduction of the content data (Content) in a reproducing device holding the root key (Kroot) securely.

14. The authoring device as claimed in claim 13, wherein the root key (Kroot) is incorporated in a content enabling key (EKB) encrypted by a device key (Kdevice) associated with the reproducing device, and the authoring key (CED) further includes the encrypted content enabling key (EKB).

15. The authoring device as claimed in claim 9, wherein the authoring key (CED) further includes encrypted checksum data.

16. The authoring device as claimed in claim 9, further comprising nullifying means for, upon updating of the authoring key (CED), nullifying the authoring key (CED) which has not been updated.

17. The authoring device as claimed in claim 9, wherein the content data (Content) consists of main content data and additional data for the main content data.

18. A method for authoring content data (Content), comprising:

generating a content identifier (CID) uniquely allocated to each of the content data (Content);

generating an authoring key enabling key (CEK) uniquely allocated to an authoring device for authoring the content data (Content);

generating an authoring key (CED) by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot);

decrypting the content key (Kc) and the second content key (EKc) from the authoring key (CED) using the content identifier (CID) and the authoring key enabling key (CEK); and encrypting the content data (Content) using the decrypted content key (Kc) to generate encrypted content data (E (Kc, Content)).

19. The authoring method as claimed in claim 18, further comprising bundling the encrypted content data (E (Kc, Content)), the content identifier (CID), and the second content key (EKc) as a package.

20. The authoring method as claimed in claim 18, wherein the root key (Kroot) is incorporated in a content enabling key (EKB) encrypted by a device key (Kdevice) associated with a reproducing device capable of generating the content data (Content), and the authoring key (CED) includes the encrypted content enabling key (EKB).

21. The authoring method as claimed in claim 18, wherein the authoring key (CED) includes encrypted checksum data.

22. The authoring method as claimed in claim 18, further comprising nullifying the authoring key (CED) if the authoring key (CED) is not updated during a step of updating the authoring key (CED).

23. A computer-implemented authoring key device for generating an authoring key for authoring content data (Content), the device comprising:

a first generator operable to generate a content identifier (CID) uniquely allocated to each of the content data (Content);

a second generator operable to generate an authoring key enabling key (CEK) uniquely allocated to an authoring device for authoring the content data (Content); and a third generator operable to generate an authoring key (CED) by encrypting a content key (Kc) and a second content key (EKc) with the content identifier (CID) and the authoring key enabling key (CEK), the content key (Kc) being for encrypting the content data (Content), and the second content key (EKc) being obtained by encrypting the content key with a root key (Kroot).

24. The authoring key device as claimed in claim 23, wherein the content key (Kc) is obtained from the second content key (EKc) and the root key (Kroot), the content key (Kc) enabling decryption of encrypted content data (E (Kc, Content)) and reproduction of the content data (Content) in a reproducing device holding the root key (Kroot) securely.

25. The authoring key device as claimed in claim 24, wherein the root key (Kroot) is incorporated in a content enabling key (EKB) encrypted by a device key (Kdevice) associated with the reproducing device, and the authoring key (CED,) further includes the encrypted content enabling key (EKB).

26. The authoring key device as claimed in claim 23, wherein the authoring key (CED) further includes encrypted checksum data.

27. The authoring key device as claimed in claim 23, further comprising nullifying means for, upon updating of the authoring key (CED), nullifying the authoring key (CED) which has not been updated.

28. An authoring device for authoring content data (Content), comprising:

a first memory for storing the content data (Content);

a second memory for storing key data, the key data including:

a content identifier (CID) uniquely allocated to each of the content data (Content);

an authoring key enabling key (CEK) uniquely allocated to the authoring device; and an authoring key (CED) obtained by encrypting a content key (Kc) and a second content key (EKc) using the content identifier (CID) and the authoring key enabling key (CEK), the content key (Kc) being for encrypting the content data (Content), and the second content key (EKc) being obtained by encrypting the content key using a root key (Kroot);

a receiver operable to receive the content identifier (CID), authoring key enabling key (CEK) and the authoring key (CED) from an authoring key generator;

a device operable to store content corresponding to the content identifier (CID);

a decryptor operable to decrypt the authoring key (CED) with the content identifier (CID) and the authoring key enabling key (CEK) to obtain the content key (Kc) and the second content key (EKc); and an encryptor operable to encrypt the content data (Content) with the decrypted content key (Kc) to generate encrypted content data (E (Kc, Content)).

* * * * *